US012473136B2

(12) United States Patent
DeBrunner et al.

(10) Patent No.: US 12,473,136 B2
(45) Date of Patent: Nov. 18, 2025

(54) INSULATED DEVICE

(71) Applicant: Insight 2 Design, LLC, Overland Park, KS (US)

(72) Inventors: Daniel E. DeBrunner, Overland Park, KS (US); Dawnelle Proctor, Overland Park, KS (US); Montel Caruthers, Overland Park, KS (US); Quaoyi Xu, Guangzhou (CN); Alex Marshall, Overland Park, KS (US)

(73) Assignee: Insight 2 Design, LLC, Overland Park, KS (US)

( * ) Notice: Subject to any disclaimer, the term of this patent is extended or adjusted under 35 U.S.C. 154(b) by 0 days.

(21) Appl. No.: 18/999,332

(22) Filed: Dec. 23, 2024

(65) Prior Publication Data

US 2025/0128872 A1    Apr. 24, 2025

Related U.S. Application Data

(60) Provisional application No. 63/627,430, filed on Jan. 31, 2024, provisional application No. 63/614,002, filed on Dec. 22, 2023.

(51) Int. Cl.
*A45C 13/10* (2006.01)
*A45C 11/20* (2006.01)
(Continued)

(52) U.S. Cl.
CPC .......... *B65D 81/3818* (2013.01); *A45C 11/20* (2013.01); *A45C 13/1069* (2013.01); *B65D 25/04* (2013.01); *B65D 81/3823* (2013.01)

(58) Field of Classification Search
None
See application file for complete search history.

(56) References Cited

U.S. PATENT DOCUMENTS

| 3,295,709 A | 1/1967 | Herrick |
| 6,070,718 A | 6/2000 | Drabwell |

(Continued)

FOREIGN PATENT DOCUMENTS

| CN | 217609932 U | 10/2022 |
| WO | 2017091761 A9 | 6/2017 |

(Continued)

OTHER PUBLICATIONS

ISA/US, International Search Report and Opinion, Feb. 25, 2025, App. No. PCT/US24/61669, titled "Insulated Device".

*Primary Examiner* — Mollie Impink
(74) *Attorney, Agent, or Firm* — John H. Choi & Associates

(57) ABSTRACT

An insulated device having a body assembly, lid assembly and closure assembly. The body assembly includes a plurality of walls and a floor forming a storage compartment. The closure assembly includes a body closure member having a first magnetic or ferro-magnetic member positioned proximate a wall top surface of at least one of the plurality of walls. The closure assembly also includes a lid closure member having a second magnetic or ferro-magnetic member positioned proximate a lid bottom surface. At least one of the body closure member and the lid closure member includes a first housing member for receiving one of the first or second magnetic or ferro-magnetic members. The storage compartment is enclosed and substantially sealed when the body closure member and the lid closure member are operably engaged, and the storage compartment is accessible when the body closure member and the lid closure member are disengaged.

7 Claims, 28 Drawing Sheets

(51) Int. Cl.
  *B65D 25/04* (2006.01)
  *B65D 81/38* (2006.01)

(56) References Cited

U.S. PATENT DOCUMENTS

| | | |
|---|---|---|
| 6,220,473 B1 | 4/2001 | Lehman |
| 6,244,458 B1 | 6/2001 | Frysinger |
| 7,162,890 B2 | 1/2007 | Mogil |
| 7,302,810 B2 | 12/2007 | McCrory |
| 7,669,436 B2 | 3/2010 | Mogil |
| 7,757,878 B2 | 7/2010 | Mogil |
| 7,841,207 B2 | 11/2010 | Mogil |
| 7,988,006 B2 | 8/2011 | Mogil |
| 8,061,159 B2 | 11/2011 | Mogil |
| 8,459,058 B2 | 6/2013 | Mogil |
| 8,857,654 B2 | 10/2014 | Mogil |
| 8,899,071 B2 | 12/2014 | Mogil |
| 9,272,475 B2 | 3/2016 | Ranade |
| 9,688,454 B2 | 6/2017 | Ranade |
| 9,828,165 B2 | 11/2017 | Ranade |
| 10,046,855 B2 | 8/2018 | Bevirt et al. |
| 10,138,047 B2 | 11/2018 | Seiders et al. |
| 10,221,005 B2 | 3/2019 | James, Jr. |
| 10,279,979 B2 | 5/2019 | Ranade |
| 10,329,074 B2 | 6/2019 | Ranade |
| 10,384,855 B2 | 8/2019 | Seiders et al. |
| 10,472,158 B2 | 11/2019 | Ranade |
| 10,526,130 B2 | 1/2020 | Sonntag et al. |
| 10,544,976 B2 | 1/2020 | Triska et al. |
| 10,676,267 B2 | 6/2020 | Seiders et al. |
| 10,766,685 B2 | 9/2020 | Kuhn |
| 10,781,028 B2 | 9/2020 | Munie et al. |
| 10,827,808 B2 | 11/2020 | Seiders et al. |
| 10,858,172 B2 | 12/2020 | Zhuang |
| 10,899,503 B2 | 1/2021 | Seiders et al. |
| 10,954,055 B2 | 3/2021 | Rogers et al. |
| 11,076,666 B2 | 8/2021 | Sullivan et al. |
| 11,142,388 B2 | 10/2021 | Dong |
| 11,142,389 B1 | 10/2021 | Dong |
| 11,172,741 B2 | 11/2021 | Seiders et al. |
| 11,174,090 B2 | 11/2021 | Rogers et al. |
| 11,229,268 B2 | 1/2022 | Munie et al. |
| 11,242,189 B2 | 2/2022 | Rogers et al. |
| 11,279,546 B2 | 3/2022 | Seiders et al. |
| 11,363,865 B2 | 6/2022 | Seiders et al. |
| 11,407,579 B2 | 8/2022 | Munie et al. |
| 11,565,872 B2 | 1/2023 | Rogers et al. |
| 11,608,213 B2 | 3/2023 | Seiders et al. |
| 11,685,589 B2 | 6/2023 | Munie et al. |
| 11,730,244 B2 | 8/2023 | Sullivan et al. |
| 11,751,649 B2 | 9/2023 | Seiders et al. |
| 11,766,103 B2 | 9/2023 | Seiders et al. |
| 11,958,676 B2 | 4/2024 | Rogers et al. |
| 11,992,103 B2 | 5/2024 | Munie et al. |
| 12,077,363 B2 | 9/2024 | Conway et al. |
| 2011/0127274 A1 | 6/2011 | Mogil |
| 2014/0140643 A1* | 5/2014 | Li .................. A45C 11/20 |
| | | 383/111 |
| 2018/0252458 A1 | 9/2018 | Furneaux et al. |
| 2021/0024276 A1 | 1/2021 | Bradley |
| 2021/0353023 A1 | 11/2021 | Sullivan et al. |
| 2022/0017287 A1 | 1/2022 | Rogers et al. |
| 2022/0073261 A1* | 3/2022 | Mudd .................. F25D 3/06 |
| 2022/0082317 A1 | 3/2022 | Bollinger et al. |
| 2022/0110426 A1 | 4/2022 | Munie et al. |
| 2022/0153504 A1 | 5/2022 | Seiders et al. |
| 2023/0030046 A1 | 2/2023 | Lundqvist et al. |
| 2023/0064649 A1 | 3/2023 | Melanson |
| 2023/0118288 A1 | 4/2023 | Rogers et al. |
| 2023/0264887 A1 | 8/2023 | Munie et al. |
| 2023/0292894 A1 | 9/2023 | Seiders et al. |
| 2024/0016282 A1* | 1/2024 | Wang ............ A45C 13/1069 |
| 2024/0300724 A1 | 9/2024 | Van De Ven et al. |
| 2024/0350363 A1 | 10/2024 | McAdams et al. |

FOREIGN PATENT DOCUMENTS

| | | |
|---|---|---|
| WO | 2022173298 A1 | 8/2022 |
| WO | 2023096816 A1 | 6/2023 |
| WO | 2023200137 A1 | 10/2023 |
| WO | 2023200056 A1 | 11/2023 |
| WO | 2024020319 A1 | 1/2024 |
| WO | 2024252743 A1 | 12/2024 |

* cited by examiner

INSULATED DEVICE

FIELD

This invention relates to insulated devices, and more particularly to portable insulated devices or containers with magnetic closures.

BACKGROUND

Insulated devices are designed to keep food and beverages at desired temperatures. Portable insulated devices are often referred to as "coolers," and these containers can keep food and beverages cold or warm. Coolers may be rigid or semi-rigid and may be insulated with materials such as foam. Coolers are relatively light-weight, constructed of less dense materials, and may include straps and handles to aid in portability.

Insulated coolers include a closure, i.e., means to open and close the cooler, that seals the body of the cooler when closed and provide access to the cooler when opened. Several different types of closures are used in the prior art. Hard coolers, made of rigid materials, usually have form-fit or friction-fit closures without additional components. Soft coolers, made of more flexible materials, usually use zippers to open and close the lids of the cooler. However, both types of closures are difficult to operate with one hand. With respect to hard coolers, because these closures operate through friction, they often require additional force to open, making it difficult to open with one hand. With respect to zippered closures of soft coolers, opening and closing the lid requires two hands to operate the zipper and therefore, a user must free both hands just to open and close the cooler.

Therefore, a need exists for a cooler that is easy to operate, with a stable closure capable of providing a reliable seal for insulation and for minimizing water and air leakage during transport, i.e., minimizing or eliminating thermal bridges, and ease of opening and closing when in use.

Consumer facing performance is described in terms of "ice retention," which is a way to communicate the thermal resistance of a cooler. There has not been much change in insulation types and performance between the most common types of everyday use personal coolers.

Many coolers are insulated with foam materials. Foam materials are good for cooler insulation because they are lightweight, versatile in forming, cost effective, durable, and have relatively good thermal resistance. However, most coolers use foam materials that have relatively low ice retention properties and performance, thereby requiring a user to supplement temperature control by other means such as ice, ice packs or heat packs to meet expected temperature maintenance.

For hard coolers, i.e., coolers with rigid enclosures or rigid protective layers, thicker insulation materials constructed of foam can be used because bulkiness is usually not an issue. Manufacturers have also used vacuum insulated panels (VIP) to enhance thermal resistance. As traditional VIPs are expensive, hard coolers in the prior art use flat and small VIPs which help only marginally with ice retention. In the application of a hard cooler, there is some added benefit when the VIP is fully enclosed by a rigid plastic enclosure of the hard cooler because it allows better protection of VIP. As such, traditional thin VIPs are typically used in hard coolers but still rarely seen because of the added cost and potential added weight. Moreover, VIP coolers in the prior art use VIPs separate and apart from adjacent VIPs, thus having gaps therebetween. As a result, thermal bridges or weak points are formed, which then allows internal air of the cooler to escape and/or ambient air to enter the cooler, thereby reducing ice retention.

For soft coolers, i.e., coolers with non-rigid or semi-rigid enclosures, it has been a challenge to make a cost-effective, well-insulated cooler. This is because, unlike hard coolers, thick conventional foam materials cannot be used due to size and weight constraints. As a result, only thin foam materials are used and therefore, most affordable soft coolers in the market are not well insulated. Also, traditional VIPs are not typically used because only thin layers of VIP can be used to be cost effective. As mentioned above, traditional flat thin layers of VIPs can be susceptible to damage due to the lack of reinforcement or support. That is, when soft coolers are transported, the base, body and/or lid can be deformed or displaced, and traditional thin VIPs therewithin could crack or break due to their brittle and fragile nature, thereby eliminating the thermal resistance qualities thereof. Because of the construction, cost, and weight of soft coolers in the prior art, only conventional foam is utilized, which does not have desirable thermal resistance.

Therefore, a need also exists for a soft cooler with improved ice retention.

While soft coolers are light weight and easily transportable, those in the prior art are incapable of having a large removable storage compartment, which would enable the user to utilize two separate large storage compartments. Moreover, traditional soft coolers are easily deformable due to their construction, and the soft inner liner is susceptible to puncture from objects stored within the cooler.

Therefore, a need also exists for a soft cooler capable of providing a removable large storage compartment and also a means for preventing damage to the soft inner liner while providing a more secure and stable structure.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

The disadvantages of the prior art insulating devices are overcome by the insulated device with a magnetic closure of the present invention. The present invention provides a cooler with a base assembly and a lid assembly, both provided with magnetic and/or ferro-magnetic members for sealing the cooler for insulation and minimizing water leakage when the lid assembly is closed and when the base and lid assemblies are engaged. The leak-resistant, water-resistant insulated device further ensures that leakage is prevented during transport. The magnetic members of the present invention also provide a means for a user to easily open the lid assembly without requiring excessive force and, if the cooler is equipped with a zipper, allows the user to leave the cooler unzipped when in use without sacrificing ice retention performance.

Moreover, as discussed above, thermal resistance is essential for an insulated device or cooler. It has been difficult for manufacturers to balance ice retention, cost and manufacturability. Traditionally, soft coolers have been insulated with conventional insulating foam constructed of one or more materials such as expanded polyethylene (EPE), ethylene vinyl acetate (EVA), nitrile butadiene rubber (NBR) and polyurethane (PU). It has been shown by testing by the applicant of the present invention that R-values for 25 mm thick traditional foams are between 2 and 4.8, whereas VIPs of 10 mm can yield an R-value up to 40, thereby improving thermal resistance 8-20 times the current foam types. This is because VIPs are composed of high-performance insulation materials sealed inside of a gas tight barrier. The vacuum eliminates air molecules, reducing heat transfer through conduction and convection. This, coupled with the low conductivity of the core material, effectively minimizes heat flow. VIPs also have come a long way in their performance and how they are formed. VIPs are also costly and therefore, others have been unable to manufacture soft coolers with VIPs in a cost-effective manner.

The disadvantages of the prior art soft coolers are overcome by providing VIPs into a soft cooler for everyday consumer use with other insulating foam such that the insulating material is capable of deforming or displacement without cracking or breaking. The present invention also provides an affordable soft cooler almost exclusively with VIPs that are durable. As a result, the soft cooler of the present invention provides a portable, insulated device with much improved thermal resistance. Indeed, based on ice retention testing conducted by the applicant of the present invention, it is shown that the one of the leading soft coolers in the industry has a 3.5-day ice retention duration, whereas the cooler of the present invention has an ice retention duration of 7 to 9 days depending on the core of the VIP panel. Thus, the present invention also provides the opportunity of an "iceless" cooler.

Moreover, the present invention provides a second storage compartment within the entire first soft cooler storage compartment that is easily secured and removable therefrom. As such, a user is able to utilize two separate large storage compartments if desired.

In one aspect, the present provides an insulated device comprising: a body assembly comprising: a plurality of walls each comprising a wall top end having a top surface and a wall bottom end; a first insulation member having a top end, the first insulation member positioned between the wall top surface and the wall bottom end; and a floor operably coupled with the plurality of walls proximate the bottom ends of the plurality of walls to form a first storage compartment; a lid assembly having a lid top surface and a lid bottom surface, the lid assembly comprising a second insulation member having a top end, the second insulation member positioned between the lid top surface and the lid bottom surface, wherein the lid assembly is at least partially removably coupled with the body assembly; and a closure assembly comprising: a body closure member comprising a first magnetic or ferro-magnetic member, wherein the body closure member is positioned proximate the wall top surface of the at least one of the plurality of walls, and between the first insulation member and the top surface of the at least one of the plurality of walls; and a lid closure member comprising a second magnetic or ferro-magnetic member, wherein the lid closure member is positioned proximate the lid bottom surface, wherein the lid closure member is positioned between the second insulation member and the lid bottom surface; wherein at least one of the body closure member and lid closure member comprises a first housing member, the first housing member configured to receive one of the first or second magnetic or ferro-magnetic members; and wherein the storage compartment is enclosed and substantially sealed when the body closure member and the lid closure member are operably engaged, and the storage compartment is accessible when the body closure member and the lid closure member are disengaged.

In another aspect, the present invention provides an insulated device comprising: a body assembly comprising: a plurality of walls each comprising a wall top end having a top surface and a wall bottom end; and a floor operably coupled with the plurality of walls proximate the bottom ends of the plurality of walls to form a first storage compartment; a lid assembly having a lid top surface and a lid bottom surface; and a closure assembly comprising: a body closure member comprising a first magnetic or ferro-magnetic member, wherein the body closure member is positioned proximate the wall top surface of the at least one of the plurality of walls; a lid closure member comprising a second magnetic or ferro-magnetic member, wherein the lid closure member is positioned proximate the lid bottom surface; wherein at least one of the body closure member and lid closure member comprises a first housing member, the first housing member configured to receive one of the first or second magnetic or ferro-magnetic members; and wherein the storage compartment is enclosed and substantially sealed when the body closure member and the lid closure member are operably engaged, and the storage compartment is accessible when the body closure member and the lid closure member are disengaged.

In yet another aspect, the present invention provides an insulated device comprising: a body assembly comprising: a plurality of walls each comprising a wall top end having a top surface and a wall bottom end; a floor operably coupled with the plurality of walls proximate the bottom ends of the plurality of walls to form a first storage compartment; a lid assembly comprising: a lid top surface and a lid bottom surface; and a closure assembly comprising: a body closure member comprising a first magnetic or ferro-magnetic member; the body closure member positioned proximate the wall top surface of at least one of the plurality of walls; and a lid closure member comprising a second magnetic or ferro-magnetic member, the lid closure member positioned proximate the lid bottom surface; wherein at least one of the body closure member and lid closure member comprises a first housing member, the first housing member configured to receive one of the first or second magnetic or ferro-magnetic members; and wherein the storage compartment is enclosed and substantially sealed when the body closure member and the lid closure member are operably engaged, and the storage compartment is accessible when the body closure member and the lid closure member are disengaged.

BRIEF DESCRIPTION OF DRAWINGS

The foregoing summary, as well as the following detailed description of presently preferred embodiments of the invention, will be better understood when read in conjunction with the appended drawings. For the purpose of illustrating the invention, the drawings show embodiments of the present invention but it should be understood that the present invention is not limited to the precise arrangements and instrumentalities shown.

In the drawings.

Figure 1:
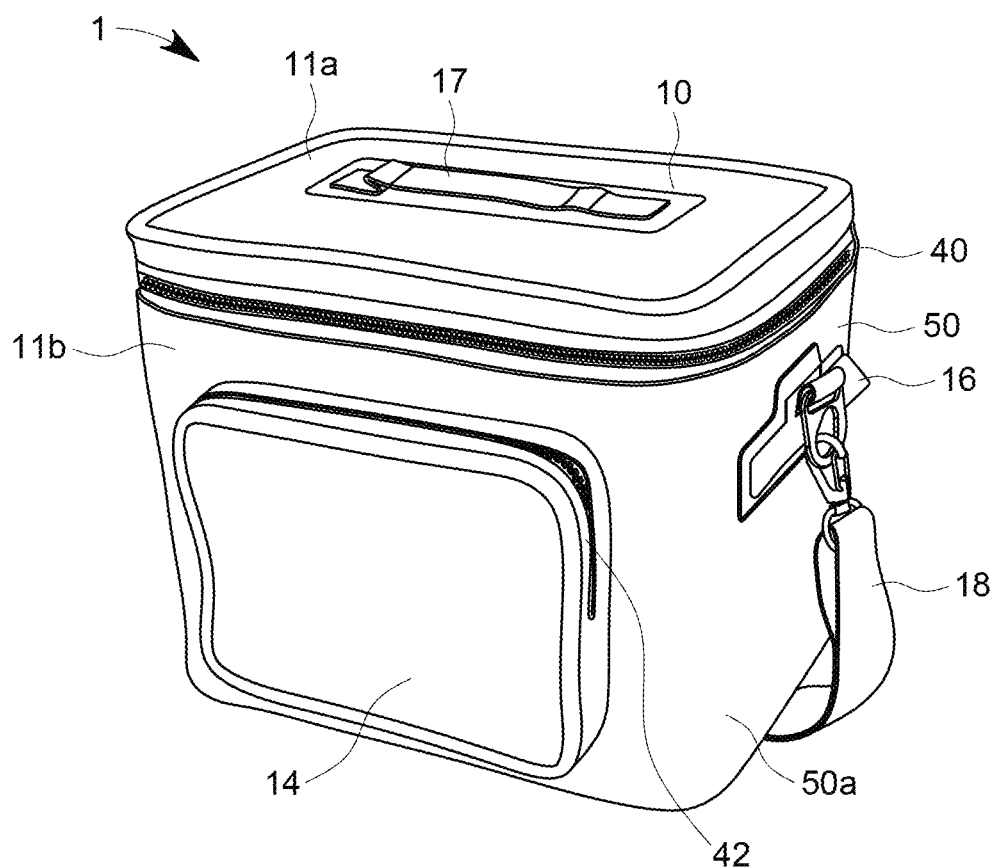
FIG. 1 is a perspective view of an embodiment of an insulated device of the present invention in a closed state.

To facilitate an understanding of the invention, identical reference numerals have been used, when appropriate, to designate the same or similar elements that are common to the figures. Further, unless stated otherwise, the features shown in the figures are not drawn to scale but are shown for illustrative purposes only.

DETAILED DESCRIPTION

Certain terminology is used in the following description for convenience only and is not limiting. The article "a" is intended to include one or more items, and where only one item is intended the term "one" or similar language is used. Additionally, to assist in the description of the present invention, words such as top, bottom, side, upper, lower, front, rear, inner, outer, right and left may be used to describe the accompanying figures. The terminology includes the words above specifically mentioned, derivatives thereof, and words of similar import.

General Structure

Figure 2:
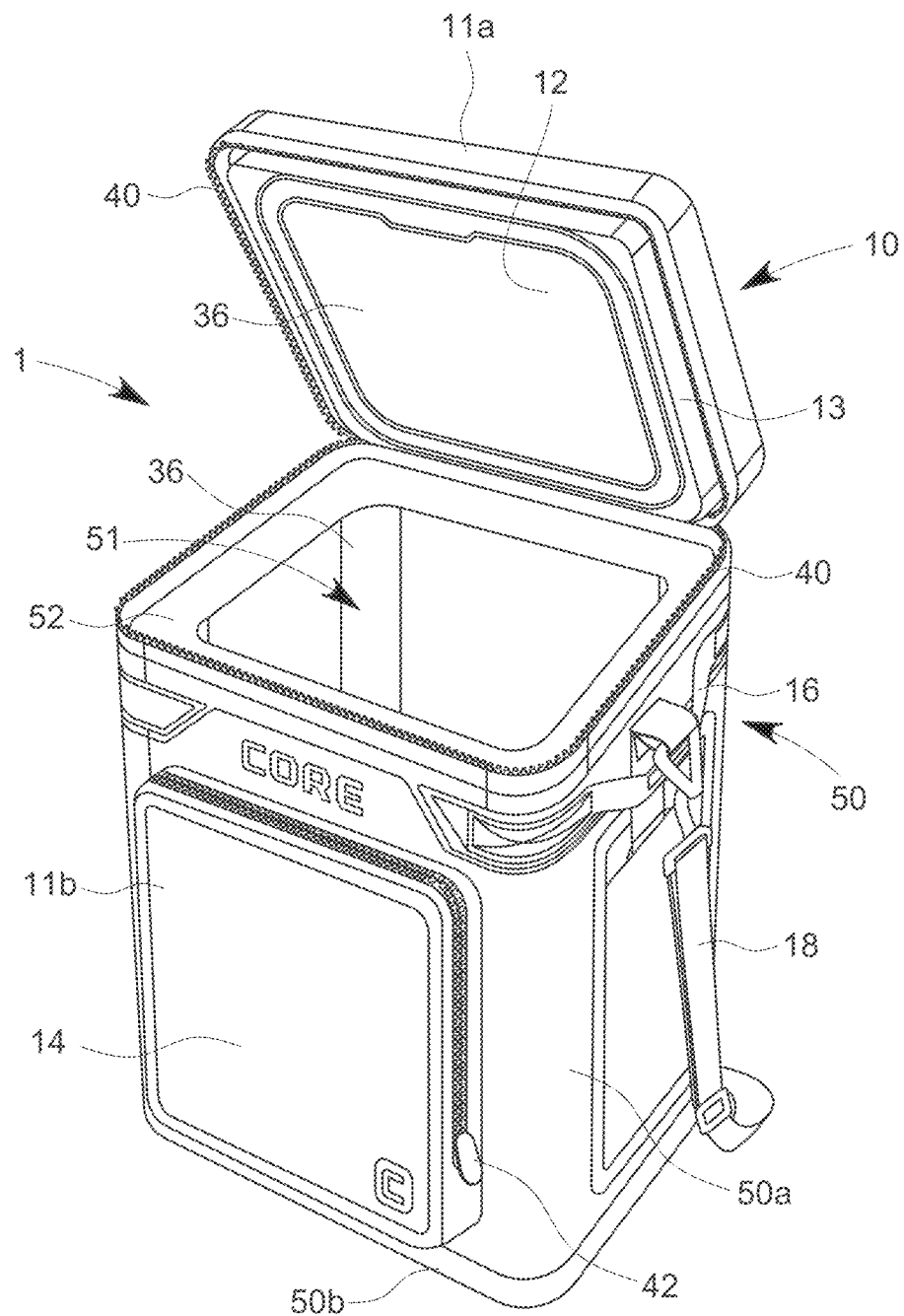
FIG. 2 is a perspective view of the insulated device of FIG. 1 in a partially opened state.

Referring to FIGS. 1-3A, an embodiment of the insulated device or cooler 1 of the present invention generally includes a lid assembly 10 and a body assembly 50 having body walls 50a and a base or floor 50b. The body walls 50a and floor 50b of the body assembly 50 form a storage compartment having a space 51 therein, and the body assembly 50 is coupled to the lid assembly 10 in a hinge-like manner, together enclosing the space 51. The lid assembly 10 and the body assembly 50 are further coupled together with a fastener 40 for opening and closing the cooler 1. In this embodiment, the fastener 40 is a waterproof zipper but other fasteners could be provided. As shown in FIG. 2, the bottom surface 12 of the lid assembly 10 extends below the zipper portion 40 of the lid assembly 10. Conversely, the top surface 52 of the body walls 50a is positioned below the zipper portion 40 of the body walls 50a. As such, when the lid assembly 10 is closed, the zipper 40 is positioned adjacent side walls 13 of the lid assembly 10. With this configuration, a firm engagement is accomplished when the zipper 40 is closed without the zipper 40 overlapping with the engagement point of the lid assembly 10 and body walls 50a. Moreover, with this configuration, the zipper 40 does not interfere with the engagement of the lid assembly bottom surface 12 and the body wall top surface 52. The fastener 40 could also be any type of closure that is not waterproof such as a hook and loop fasteners, snap fit buttons, coil zippers, mechanical lock, or magnetic snap. Also, in other embodiments, the configuration and positioning of the zipper 40 could differ without departing from the spirit and scope of the invention. Optionally, one or more additional locking mechanisms could be provided to further secure the lid assembly 10 to the body assembly 50 when the cooler 1 is in a closed state. For example, a buckle assembly could be attached to the lid 10 on one end and the body assembly 50 on another end so that the user could buckle and unbuckle the buckle assembly if desired.

Referring again to FIGS. 1-3A, an outer fabric cover 11a, 11b, preferably a durable water-resistant fabric, is positioned on an outside surface of the lid assembly 10, as well as the body assembly 50. The outer fabric 11a, 11b of the cooler 1 is positioned above/outside a liner 36 of insulation members 30, 130 of the lid and body assemblies 10, 50 and further protects the outer liner layer 36 from wear and tear. The fabric cover 11a, 11b also provides additional features to the cooler 1. For example, the outer body walls 50a include various features such as a zippered pocket 14 with a waterproof zipper 42, handles 16, 17, and a shoulder strap and/or backpack straps 18 for convenience to the user. Other features could be included on the outside surface of the cooler 1 as well.

Figure 2A:
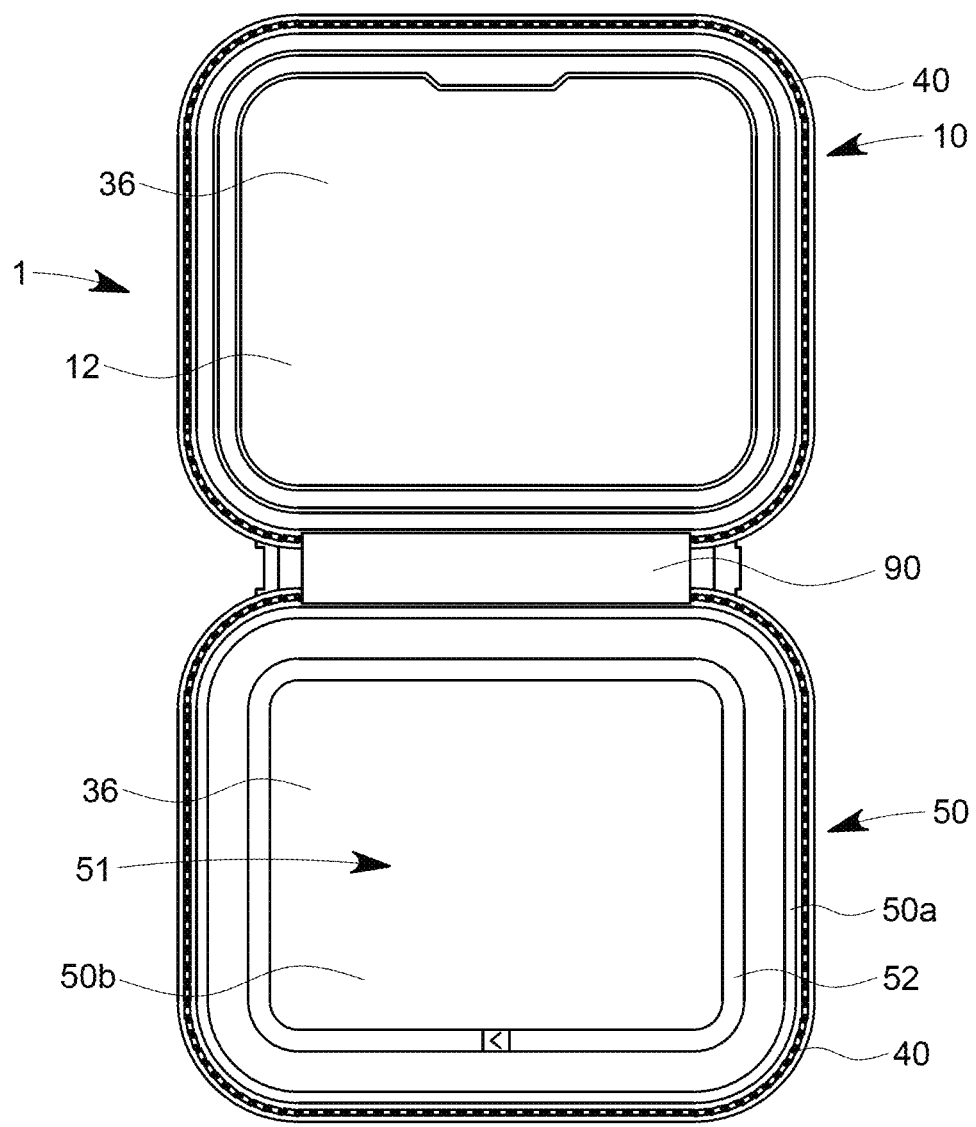
FIG. 2A is a top view of the insulated device of FIG. 1 in a fully opened state.

When the cooler 1 is in a closed state, as shown in FIG. 1, the bottom surface 12 of the lid assembly 10 and the top surface 52 of the body assembly 50 are engaged. In this configuration, the lid assembly 10 is secured to the body assembly 50, minimizing air and liquid from entering and exiting the cooler 1. A user further closes the fastener 40 to provide a water-tight seal. To open the cooler 1 to an open state, as shown in FIGS. 2 and 2A, the user opens the fastener 40 and engages the lid assembly 10 upward.

The outer structure of the insulated device of the present invention as described above generally applies to each of the embodiments described below. However, the configurations described herein are not limiting.

Body and Lid Assemblies—EVA Foam

Figure 3:
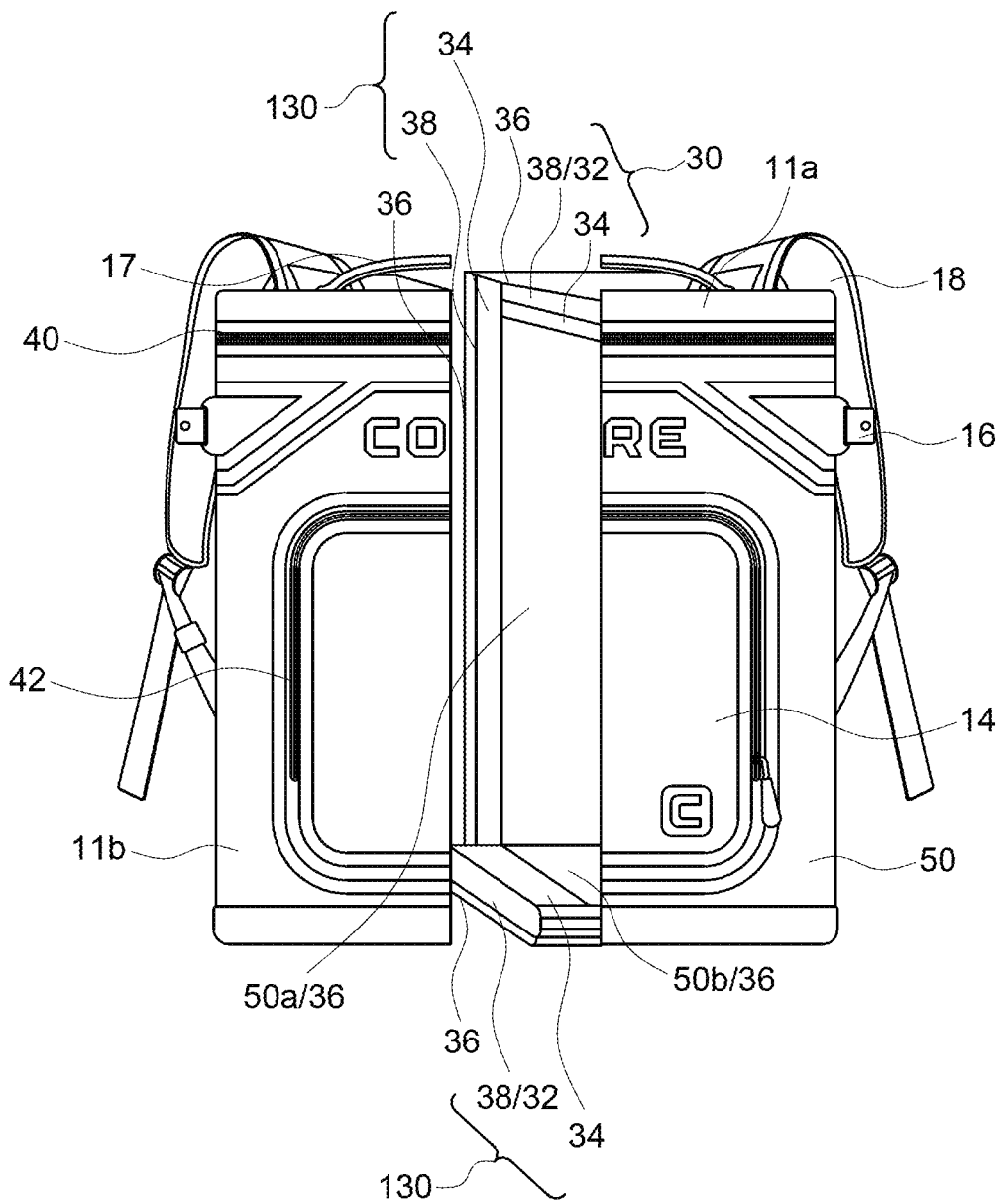
FIG. 3 a sectional view the insulated device of FIG. 1.
Figure 3A:
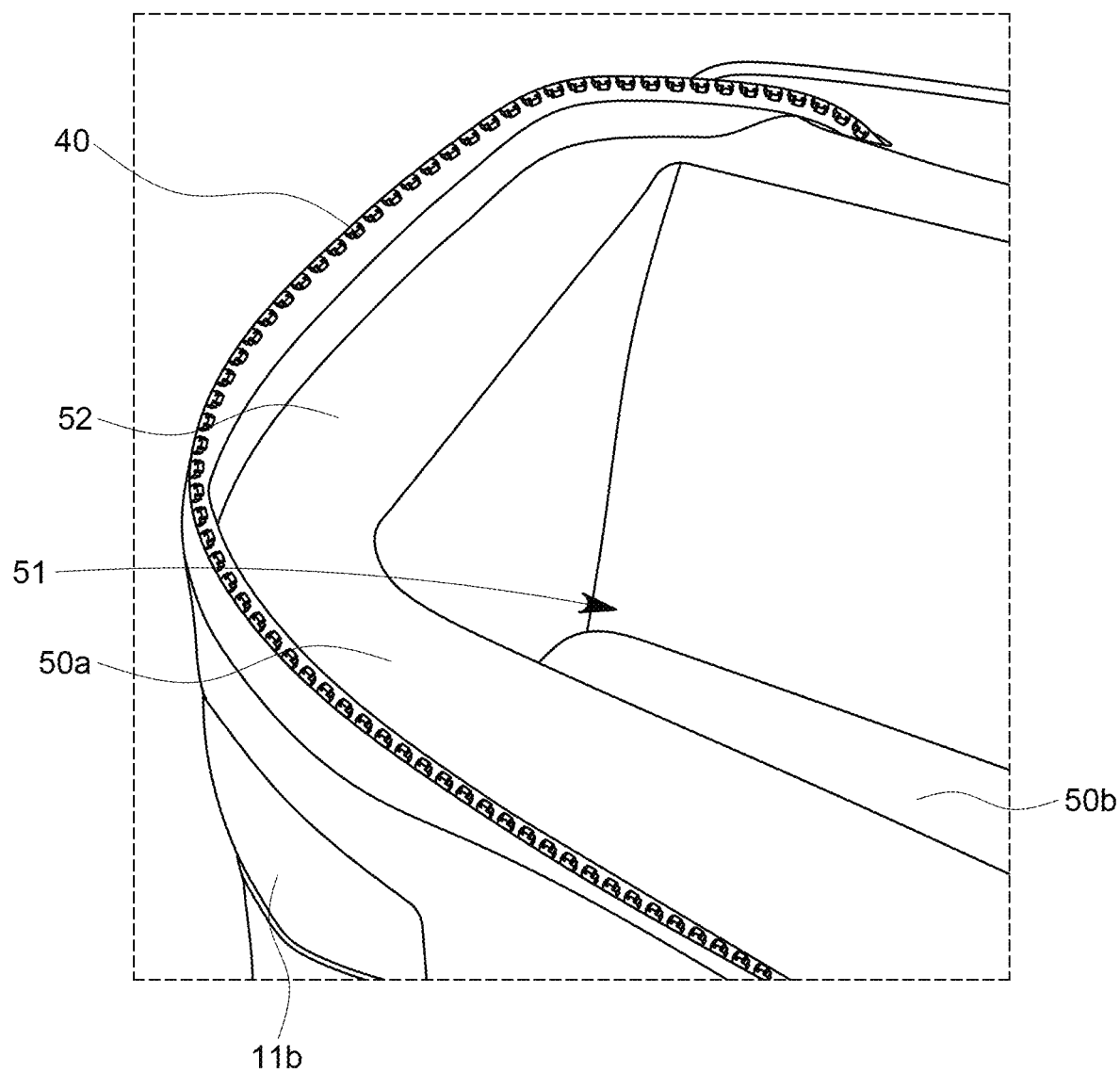
FIG. 3A is a perspective view of the interior of the insulated device of FIG. 1.

Referring to FIGS. 3 and 3A, generally, the core or inner panels of each of the lid assembly 10 and body assembly 50 (walls 50a and floor 50b) are constructed of varying thicknesses of insulating materials generally having an inner insulation material 38, one or more intermediate portions 34 and an outer liner portion 36. For the sake of clarity, the combination of materials that make up the core of inner panels of the lid assembly 10 excluding the outer liner portion 36 will be referred to as the lid insulation member 30, and the combination of materials that make up the core of inner panels of the body assembly 50 excluding the outer liner portion 36 will be referred to as the body insulation member 130. In an embodiment, the insulation member 38 is ethylene vinyl acetate (EVA) foam having a thicknesses of between 25 mm and 26 mm. A metalized reflective plastic film 34, in this embodiment Mylar film, is laminated to the EVA foam 38 by heat melting. The EVA foam 38 and film are then covered on all sides with the liner 36. The liner 36 is a water repellant and abrasion resistant material, such as 840D nylon fabric coated with a Thermoplastic Polyurethane (TPU) material. The 840D nylon fabric 36 is abrasion resistant, tear resistant, and can withstand wear and tear, and the TPU material is impermeable and water-resistant. As such, the EVA foam insulation member 38, plastic film 34 and the outer layer liner (840D nylon coated with TPU) 36 provide an insulated structure. It is noted that the materials and amounts thereof could vary and therefore, are not limited. In this embodiment, the EVA foam 38 is positioned toward the inside of the cooler 1 but in other embodiments, the EVA foam 38 could be positioned toward the outside of the cooler 1 as well.

Still referring to FIG. 3, in another embodiment, the core or inner panels of the body walls 50a, floor 50b and/or lid 10 are constructed of an inner expanded polyethylene (EPE) foam 32 of 25 mm in thickness and an outer ethylene vinyl acetate (EVA) foam 38 of 3 mm in thickness. For the body walls 50a and the floor 50b, the layer of composite reflective film 34 is sandwiched between the EPE foam 32 and EVA foam 38, and laminated to each side of the EPE foam 32 and the EVA foam 38 by heat melting. The structure is covered on all sides with the Thermoplastic Polyurethane (TPU) liner 36 described above.

In both embodiments described above, the outer TPU liner layers 36 of the body walls 50a are heat welded together (e.g., high frequency welding or ultrasonic welding) to create an empty shell that the constructed core or inner panel described above is inserted into and then subsequently enclosed by heat welding. In one embodiment, a continuous TPU shell 36 is formed with an opening for the cores or inner panels of the body wall 50a to be inserted into. Free ends of the TPU shell 36 are then heat welded to enclose the core or inner panel of the body wall 50a. The walls 50a are then folded to form a four-sided wall structure and free ends of the enclosed TPU shell 36 are heat welded together to form a fully enclosed wall structure of the body assembly 50. Alternatively, each body wall 50a could have its own TPU shell 36, and each core or inner panel could be individually housed with its own TPU shell 36 and then each of the four TPU filled shells 36 could be heat welded together to form a fully constructed four-sided wall structure of body assembly 50.

With respect to the floor 50b and lid assembly 10, separate TPU shells 36 are formed each with an opening, and the core or inner panel of the floor 50b and lid assembly 10 are inserted into respective TPU shells 36. Free ends of each TPU shell 36 are then heat welded to enclose the respective core or inner panel of the floor 50b and lid assembly 10. Alternatively, for the floor 50b, the core or inner panel is adhered to the TPU layer 36 with a double-sided tape instead of having a TPU shell 36 with an opening. The body walls 50a and floor 50b are then heat welded together to form a fully constructed body assembly 50.

Referring to FIG. 2A, in this embodiment, the lid assembly 10 and the base assembly 50 are coupled together by a coupling member 90 also constructed of TPU coated 840D nylon. Opposing ends of the coupling member 90 are attached to TPU material 36 of the lid assembly 10 and the body assembly 50 by high frequency welding. With this configuration, the lid assembly 10 remains attached to the body assembly 50 in a closed state of the cooler 1 (FIGS. 1 and 3) as well as an opened state of the cooler 1 (FIGS. 2 and 2A) in a hinged manner. It is noted that the construction of the coupling member 90 and liner member 36 could vary and therefore, are not limited to high frequency welding.

Body and Lid Assemblies—Vacuum Insulated Panels

Referring to FIGS. 4-10, in other embodiments, the core or inner panel could include vacuum insulated panels (VIP). For purposes of clarity, only the inner VIP construction of the cooler 1 is described below. The cooler outer construction of the VIP embodiments described below are identical to the outer construction of the cooler 1 described above, i.e., liner layer 36 and outer fabric 11.

Figure 4:
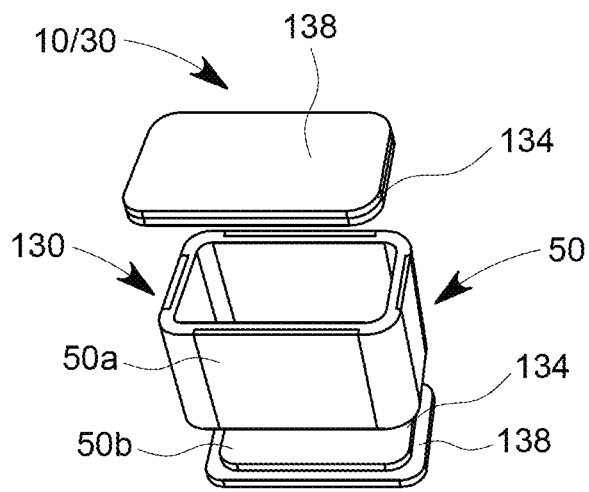
FIG. 4 is an exploded view of an embodiment of insulation members of the insulated device of FIG. 1.
Figure 5:
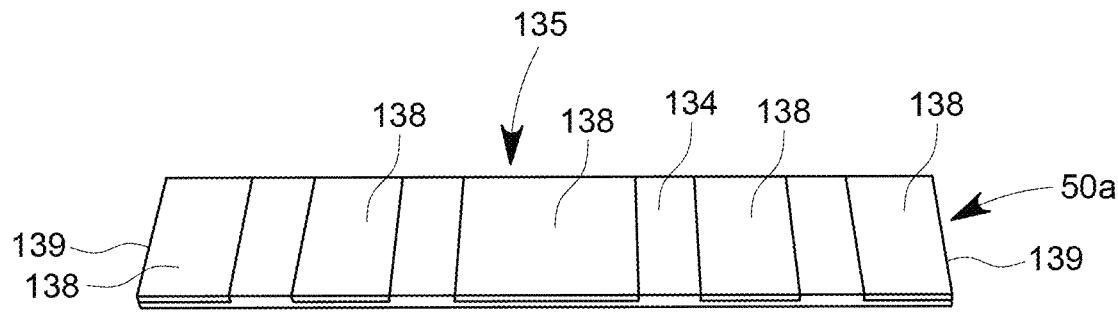
FIGS. 5 and 6 are perspective views of the body insulation member of FIG. 4.
Figure 6:
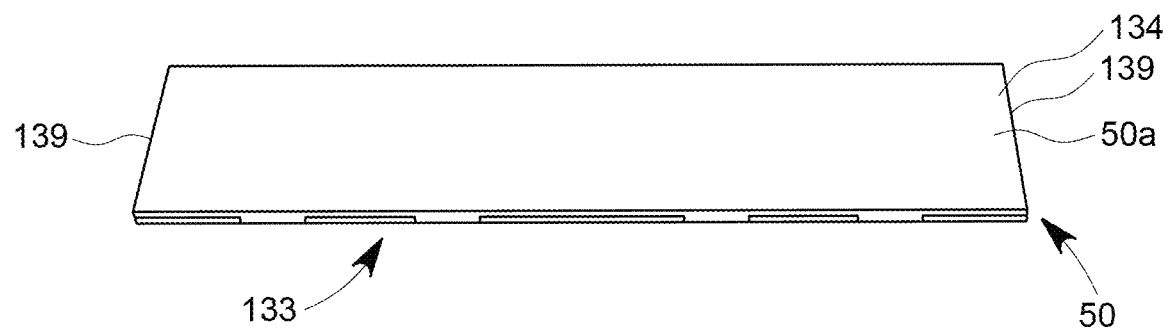

Referring to FIGS. 4-6, in one embodiment, in each section of lid assembly 10, body walls 50a and floor 50b, the core or insulation member 30, 130 includes VIPs 138 attached to ethylene vinyl acetate (EVA) foam 134 via adhesive tape. Alternatively, the VIPs 138 and EVA foam 134 could be attached with other adhesives such as glue, or assembled by inserting the sections into a protective case. With respect to the lid assembly 10, the VIP 138 has a thickness between 8 to 10 mm and is positioned above the EVA foam 134, which has a thickness of about 15 mm, with a desired combined thickness of 25 mm. Similarly, with respect to the base or floor 50b, the VIP 138 has a thickness of 8 to 10 mm and is positioned below the EVA foam 134, which has a thickness of about 15 mm, with a combined thickness of 25 mm. As shown in FIG. 4, the EVA foam 134 of the base or floor 50b is smaller in dimension and sized so that a lip 137 is formed on outer edges of the VIP 138. As a result, the body walls 50a are positioned on the lip 137 and mounted flush. The body walls 50a are constructed of a continuous elongated panel having an inner layer 133 of EVA foam 134 having a thickness of about 15 mm and extending the length of the body walls 50a, as shown in FIG. 6. An outer layer 135, as shown in FIG. 5, includes portions of VIPs 138 having a thickness of 8 to 10 mm alternating with portions of EVA foam 134 having a thickness of 8 to 10 mm, each of which are attached to the inner EVA foam layer 133 via adhesive tape or glue. Therefore, the desired combined thickness of the inner and outer layers 133, 135 is 25 mm. Each VIP 138 is sized to cover a substantial portion of respective side walls 50*a*, as shown in FIG. 4. As such, the dimensions and positions of the VIPs 138 are pre-determined prior to construction. Overlapping EVA foam portions 134 on the inner and outer layers 133, 135 are sufficiently ductile and the assembled body walls 50*a* are formed by bending those portions, with the VIPs 138 positioned on the outside, as shown in FIG. 4. Free ends 139 of the elongated panel are coupled together with adhesive tape, preferable adhesive tape at least partially constructed with thermoplastic polyurethane (TPU) material. Alternatively, an additional layer of nitrile butadiene rubber (NBR) could be attached to the inner EVA foam layer 133 to provide even better thermal insulation. In any event, studies conducted by the applicant of the present invention have shown better thermal insulation when the VIPs 138 are positioned as the outer layer 135 as shown in the figures.

Figure 7:
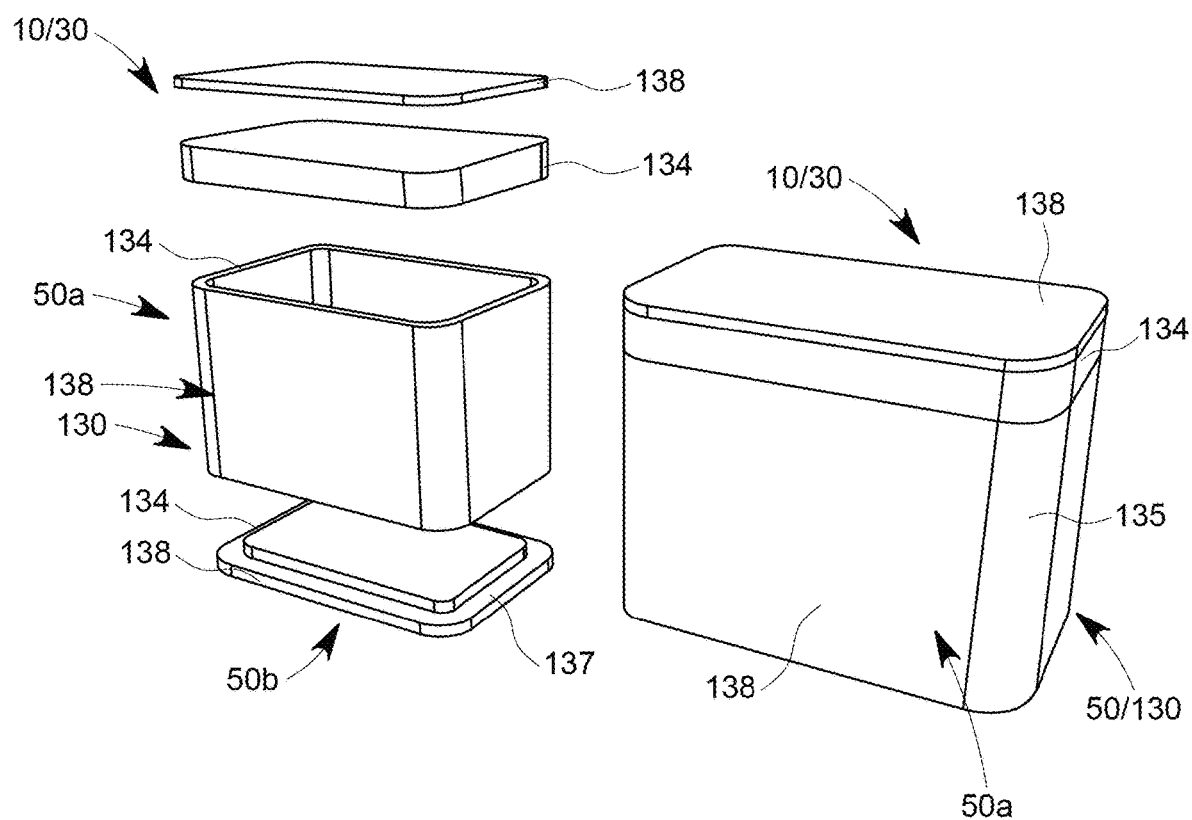
FIG. 7 shows exploded and assembled views of another embodiment of insulation members of the insulated device of the present invention.
Figure 8:
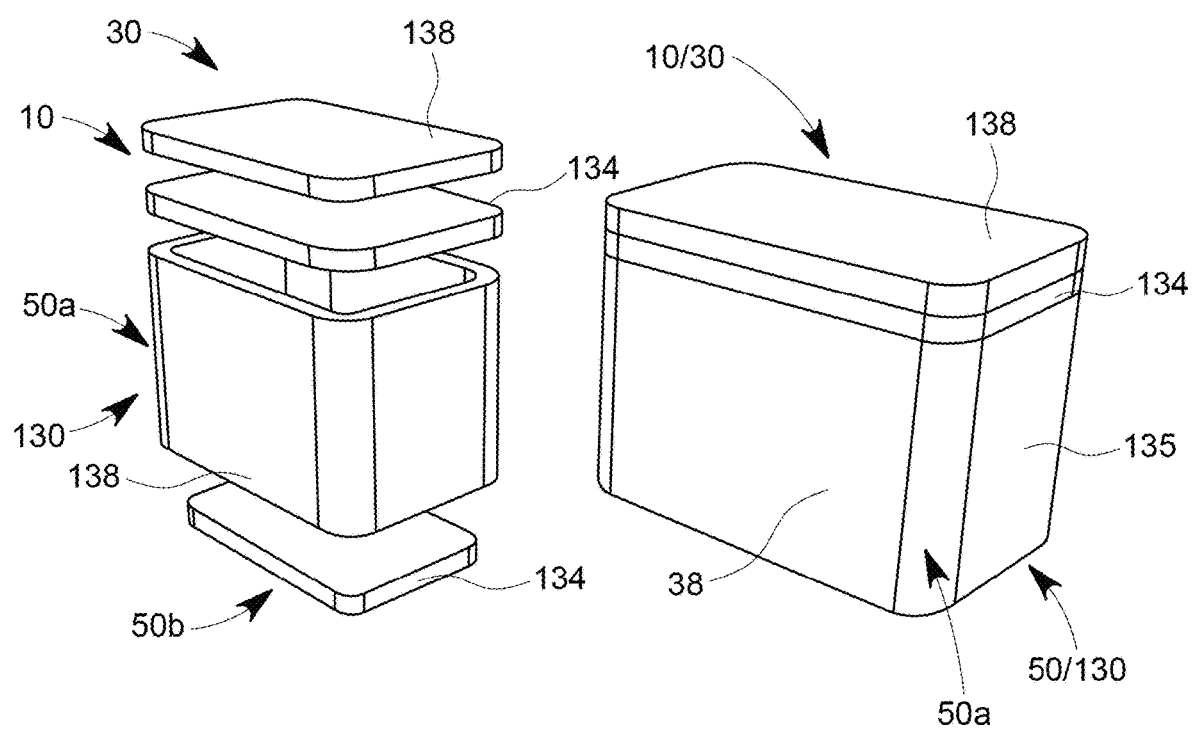
FIG. 8 shows exploded and assembled views of another embodiment of insulation members of the insulated device of the present invention.

Referring to FIGS. 7 and 8, other embodiments of a VIP core or internal panels (insulation members 30, 130) of the cooler 1 of the present invention are shown. Each section of the core, i.e., lid assembly 10, body walls 50*a* and base or floor 50*b*, includes VIP 138 with or without EVA foam 134 attached thereto via adhesive tape. Alternatively, the VIPs 138 and EVA foam 134 could be attached with other adhesives such as glue. EVA foam 134 is used with the lid assembly 10 as studies conducted by the applicant have shown that a more efficient seal is provided as a result. With respect to the lid assembly 10, the VIP 138 has a thickness of 10 mm and is positioned above the EVA foam 134, which has a thickness of 40 mm, as shown in FIG. 7. Alternatively, the VIP 138 and EVA are both 25 mm, as shown in FIG. 8. With respect to the base or floor 50*b*, in the embodiment shown in FIG. 7, the VIP 138 has a thickness of 10 mm and is positioned below the EVA foam 134, which has a thickness of 15 mm. The EVA foam 134 of the base 50*b* is smaller in dimension and sized so that a lip 137 is formed on outer edges of the VIP 138. As a result, the body walls 50*a* are positioned on the lip 137 and mounted flush. Alternatively, as shown in FIG. 8, the floor 50*b* could be constructed with VIP of 25 mm and sized substantially the same as the opening formed at the bottom end of the constructed inner panels of the body walls 50*a*. In the embodiment shown in FIG. 7, the inner panels of the body walls 50*a* are initially constructed of a continuous elongated panel having a continuous inner layer of EVA foam 134 having a thickness of 15 mm, and a continuous outer layer of VIP 138 having a thickness of 10 mm, which are coupled together via adhesive tape. In the embodiment shown in FIG. 8, the inner panels of the body walls 50*a* are initially constructed of a continuous elongated panel having a continuous VIP 138 having a thickness of 25 mm, which are coupled together via adhesive tape. The combined core or internal panel of the body walls 50*a* are sufficiently ductile and formed by bending the internal panel of the body walls 50*a*. Free ends of the elongated panel are coupled together with adhesive tape, preferable adhesive tape at least partially constructed with thermoplastic polyurethane (TPU) material. The internal panels of the body walls 50*a* and base or floor 50*b* are then attached by TPU adhesive tape to form the body assembly 50. The body assembly 50 is then enclosed with one or more pieces of 840D nylon fabric coated with a TPU material, as described above as reference number 36. Preferably, the nylon fabric 36 is one continuous piece within the space 51 of the body assembly 50. Other pieces of the nylon fabric 36 are heat welded together (e.g., high frequency welding or ultrasonic welding) to form a water-tight, air-tight seal around the receptacle of the body assembly 50. With respect to the internal panels of the lid assembly 10, one or more pieces of 840D nylon fabric coated with a TPU material 36 are heat welded together to form a water-tight, air-tight seal around the internal panels of the lid assembly 10. Alternatively, the 840D nylon fabric coated with a TPU material 36 could be taped or sewn together. With this configuration and method of manufacture, thermal resistance is more uniform throughout the cooler 1.

Figure 9:
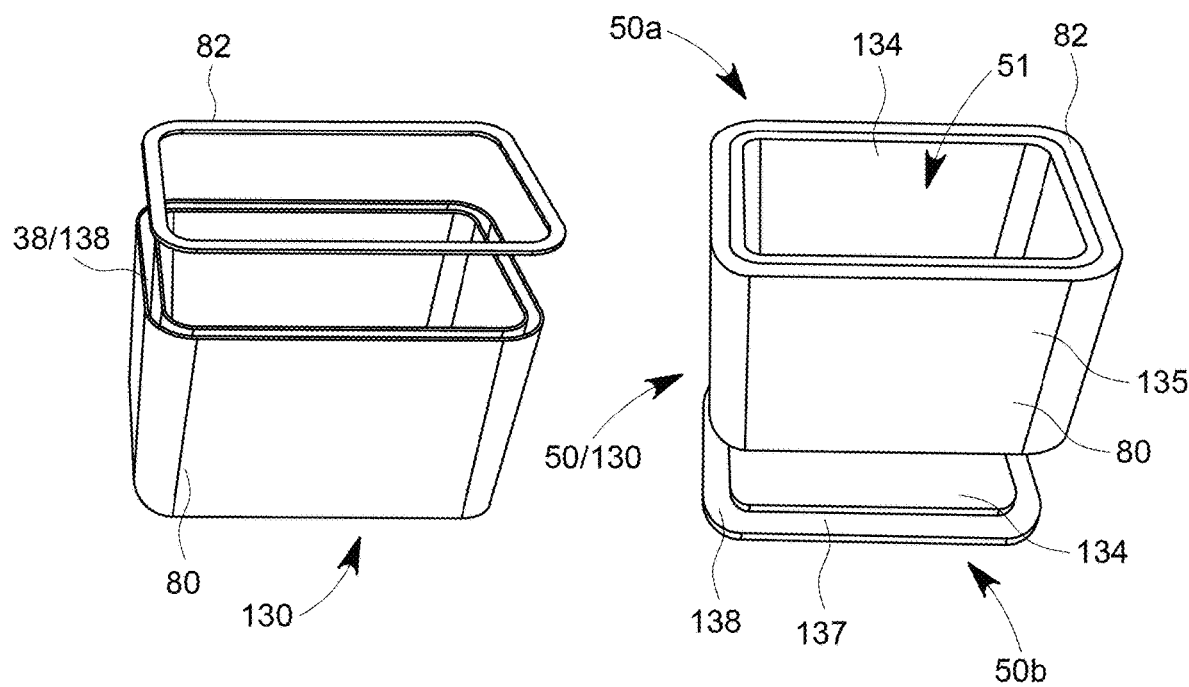
FIG. 9 shows exploded and assembled views of another embodiment of insulation members of the insulated device of the present invention.

Referring to FIG. 9, whether the core or inner panels of the lid assembly 10 or body assembly 50 include insulation members having EVA, VIP or a combination thereof, insulation can be further improved by further enclosing the core or inner panels prior to covering the core or inner panels with the nylon/TPU liner 36. As an example, as shown in FIG. 9, the EVA panels 38 or VIP panels 138 of the body assembly 50 are enclosed within a substantially similarly sized and shaped case 80 having sealed walls and a sealed bottom integral thereto and constructed of injection molded acrylonitrile butadiene styrene (ABS). Other injection molded plastic could be used to form the case 80 as well. The inner panels 138 are completely enclosed and sealed within the case 80 by a seal ring 82 at a top portion, thus providing an insulation member 130 with an added layer of protection to the inner panels 138. The case 80 is then coupled with a continuous elongated panel having a continuous inner layer of EVA foam 134 having a thickness of 15 mm, via adhesive tape. The EVA foam 134 is also sufficiently ductile and as such, the inner layer is formed by bending the EVA foam 134 to a size and shape sufficient to attach to the inside surface of the case 80 to form the body assembly or compartment 50. The body assembly compartment 50 is then enclosed with one or more pieces of 840D nylon fabric coated with the nylon/TPU material 36, as described above.

Figure 10:
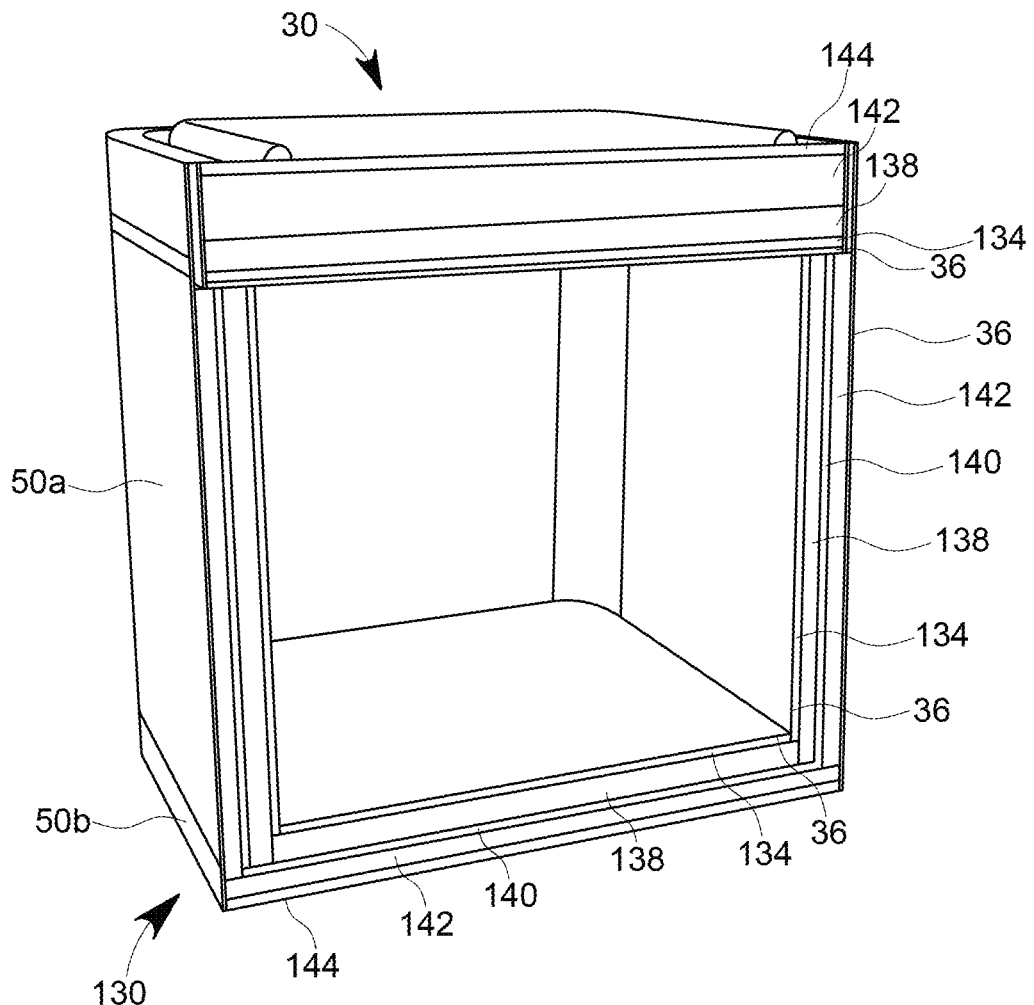
FIG. 10 shows a sectional view of another embodiment of insulation members of the insulated device of the present invention.

Referring to FIG. 10, a further embodiment of the core or inner panels (insulation members 30, 130) is shown. In this embodiment, the body walls 50*a* include a 10 mm fiberglass VIP panel 138 with a 3 mm EVA member 134 attached thereto on the inside and a 1-2 mm polypropylene (PP) board 140 attached thereto on the outside. In the alternative, the PP board 140 could be replaced with the case 80 described above. A 10 mm EVA member 142 is also attached to the PP member 140 on the outside thereof. Similarly, the base or floor 50*b* includes a 12 mm fiberglass VIP panel 138 with a 3 mm EVA member 134 attached thereto on the inside and a 2 mm polypropylene (PP) member 140 attached thereto on the outside. A 10 mm EVA member 142 is also attached to the PP member 140 on the outside thereof. A further EVA base member 144 is attached to the outside of the EVA member 142. The combined construction of the body walls 50*a* and floor 50*b* is then enclosed with the 840D nylon fabric with TPU laminate 36 and then an outer fabric or cover 11*b*, as described above. With respect to the lid assembly 10, a 12 mm fiberglass VIP 138 is surrounded by a 5 mm EVA member 134 on the inside and a 30 mm EVA member 142 on the outside. A further EVA lid member 144 is attached to the outside of the EVA member 142. The combined construction of the lid assembly 10 is then enclosed with the 840D nylon fabric with TPU laminate 36 and then an outer fabric or cover 11*a*, as described above. Studies have shown that the construction of this embodiment yields even better ice retention.

With respect to the VIPs of the embodiments described herein, they are constructed of compressed glass fiber vacuum sealed by a layer of aluminum foil and an outer layer of impermeable plastic film to form a gas-tight membrane wall. Other inner materials could be used such as fumed silica, aerogel, perlite, compressed wool fiber, graphene and graphite. Moreover, even though the embodiments disclosed herein have the VIPs positioned radially outward from the center of the cooler 1, the VIPs could also be positioned radially inward, albeit resulting in less thermal resistance.

With respect to the EVA foam or materials described herein, testing has shown that EVA foam or material having a density of 30 kg per cubic meter is sufficient to accomplish sufficiently improved thermal resistance when combined with VIPs having thicknesses specified herein. However, other foam materials can be used to replace or used in combination with EVA foam such as EPE, NBR and PU foam. These alternative materials could vary in density and thickness depending on the application and resulting ice retention.

As for the internal panels of the lid assembly 10, body walls 50a and base or floor 50b described above, each component could be housed within a protective case made of metal or plastic, such as the case 80 described above, prior to applying the nylon-TPU cover or shell 36, to provide additional support and protection from damage to the internal panels.

As described above, in the embodiments disclosed herein, the internal panels of the lid assembly 10, body walls 50a and base 50b are housed or enclosed with 840D nylon fabric coated with a TPU material 36. However, other materials with similar qualities such as PVC could be used.

Closure Assemblies

Figure 11:
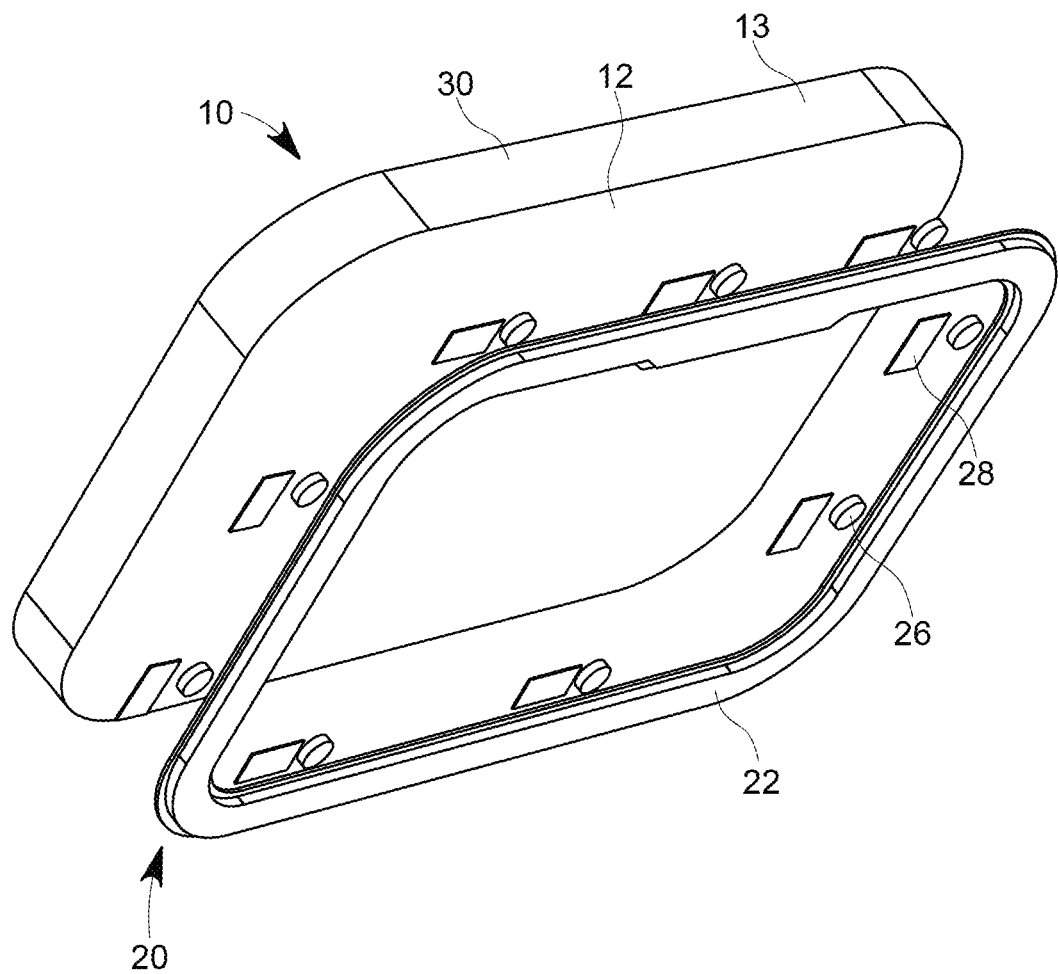
FIG. 11 is an exploded view of an embodiment of a lid insulation member and lid closure member of the present invention.
Figure 13:
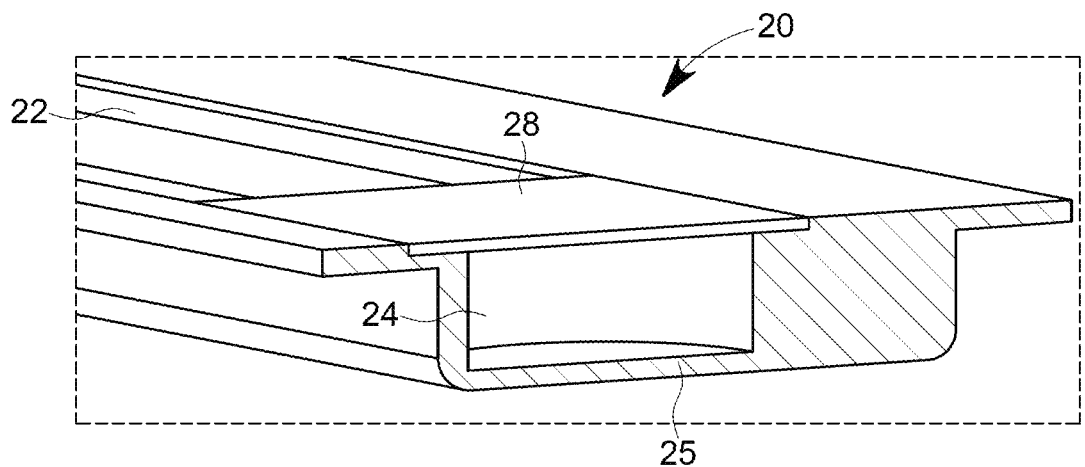
FIG. 13 is a sectional view of the lid closure member of FIG. 11.
Figure 14:
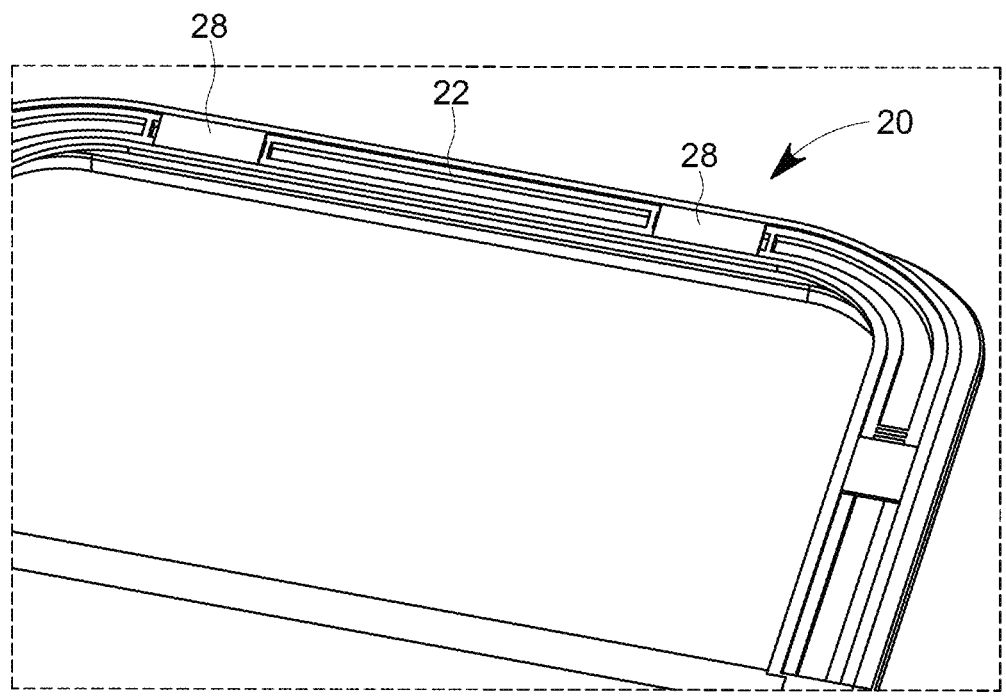
FIG. 14 is a partial top perspective view of the lid closure member of FIG. 11.

Referring to FIGS. 11, 13 and 14, the lid assembly 10 includes an upper magnetic assembly or lid closure member 20 having a housing member, in this embodiment, an upper tray, holding assembly or ring 22, constructed of TPU material. The upper tray 22 is formed by injection molding and is sized and shaped to attach to the TPU coated bottom surface 12 of the lid 10, at or near an outer perimeter thereof. In this embodiment, the lid assembly 10 is rectangular so the upper tray 22 is rectangular as well. In other embodiments where the lid assembly 10 is of another shape, such as square, the upper tray 22 is shaped as a square. The upper tray 22 includes a plurality of spaced apart cavities or receptacles 24 for receiving and housing a plurality of magnetic members 26. As shown in FIG. 13, each cavity 24 includes a floor 25 having a minimal thickness such that the magnetic force of the magnetic members 26 is not deteriorated. Moreover, the upper tray 22 being constructed of TPU material minimizes interference of magnetic force the floor 25 may cause. In this embodiment, the cavities 24 and magnetic members 26 are cylindrical in shape but other cross-sectional shapes, such as oval, square or rectangular, could be used as well. The cavities 24 are shaped and sized substantially similar to the magnetic members 26 such that the magnetic members 26 are housed therein by friction fit or form fit.

Figure 17:
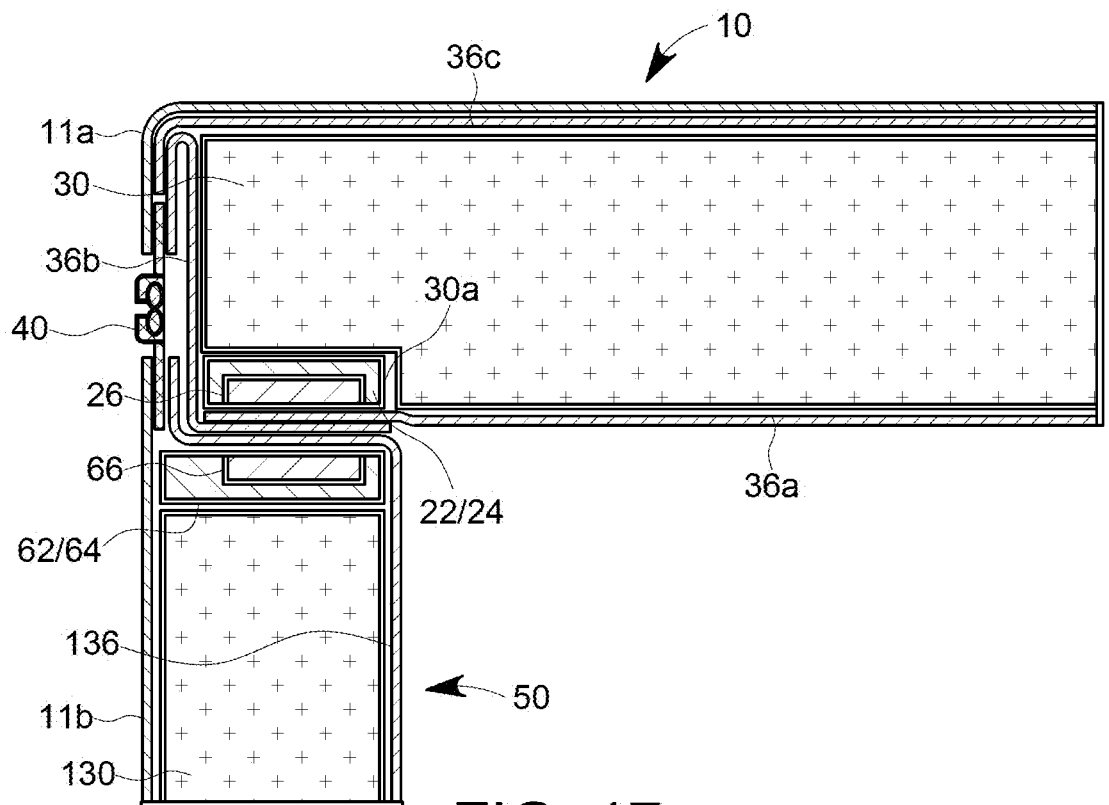
FIGS. 17-19 are sectional views illustrating embodiments of closure assemblies of the present invention.
Figure 18:
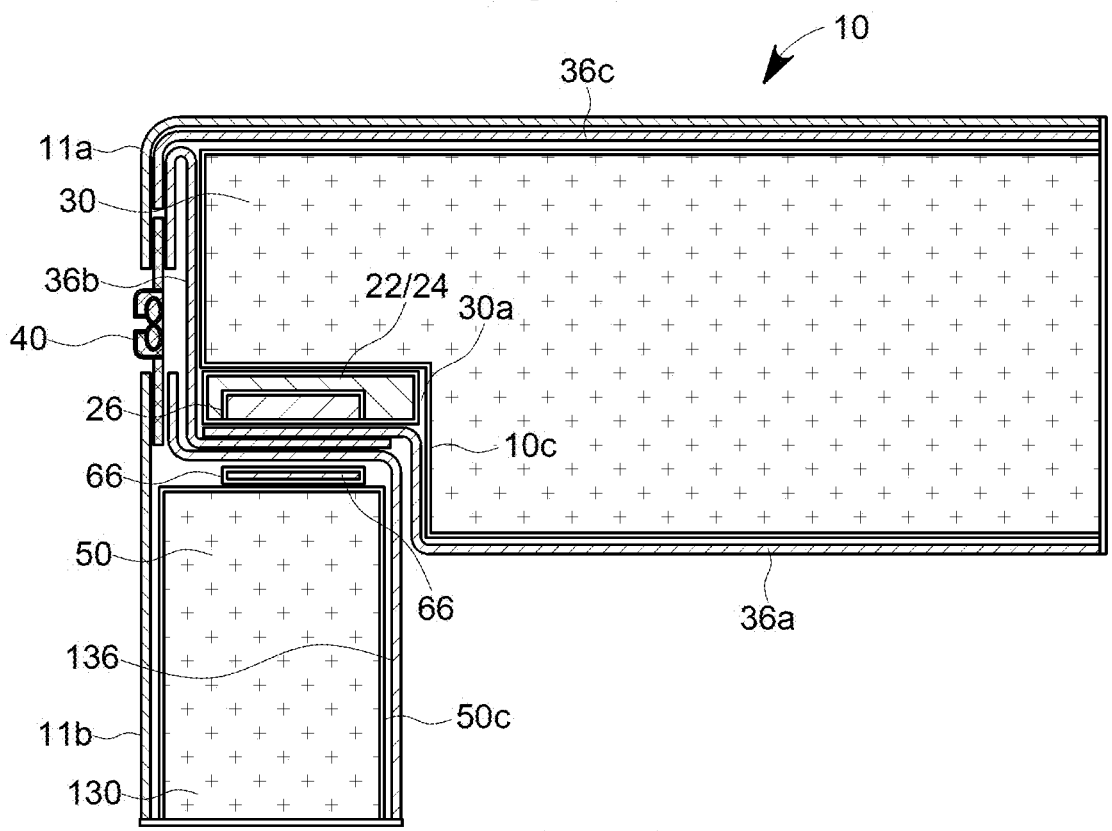
Figure 19:
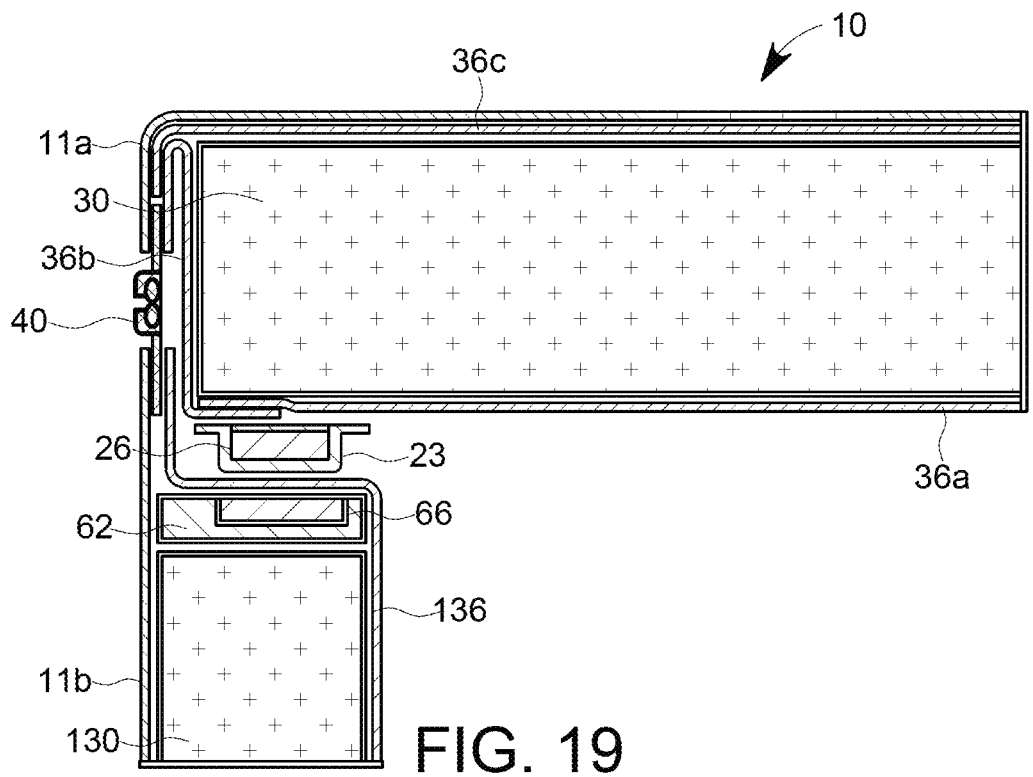

Referring to FIGS. 13 and 14, the magnetic members 26 are further secured to the cavities 24 with adhesive tape 28 constructed of TPU material by applying the tape 28 above each cavity 24 with the magnetic member 26 housed therein. Alternatively, a TPU material could be welded to the tray, holding assembly or ring 22 to secure the magnetic members 26. An extended tape or material could also be applied continuously on the upper tray 22 to cover more than one magnetic member 26 with the extended tape or material. Alternatively, the cavities or receptacles 24 could have an adhesive to secure the magnetic members 26 therein. In a further alternative, the magnetic members 26 could be injection molded with the tray or ring 22 thereby embedding the magnetic members 26 within the injection molded plastic. In one embodiment, the upper tray 22 is attached to the bottom surface of the inner liner 36 of the lid assembly 10 by high frequency welding of opposing TPU material, as shown in FIG. 19. In other embodiments, the upper tray 22 is positioned directly below the lid insulation member 30 and collectively enclosed within the inner liner 36, as shown in FIGS. 17 and 18.

Figure 12:
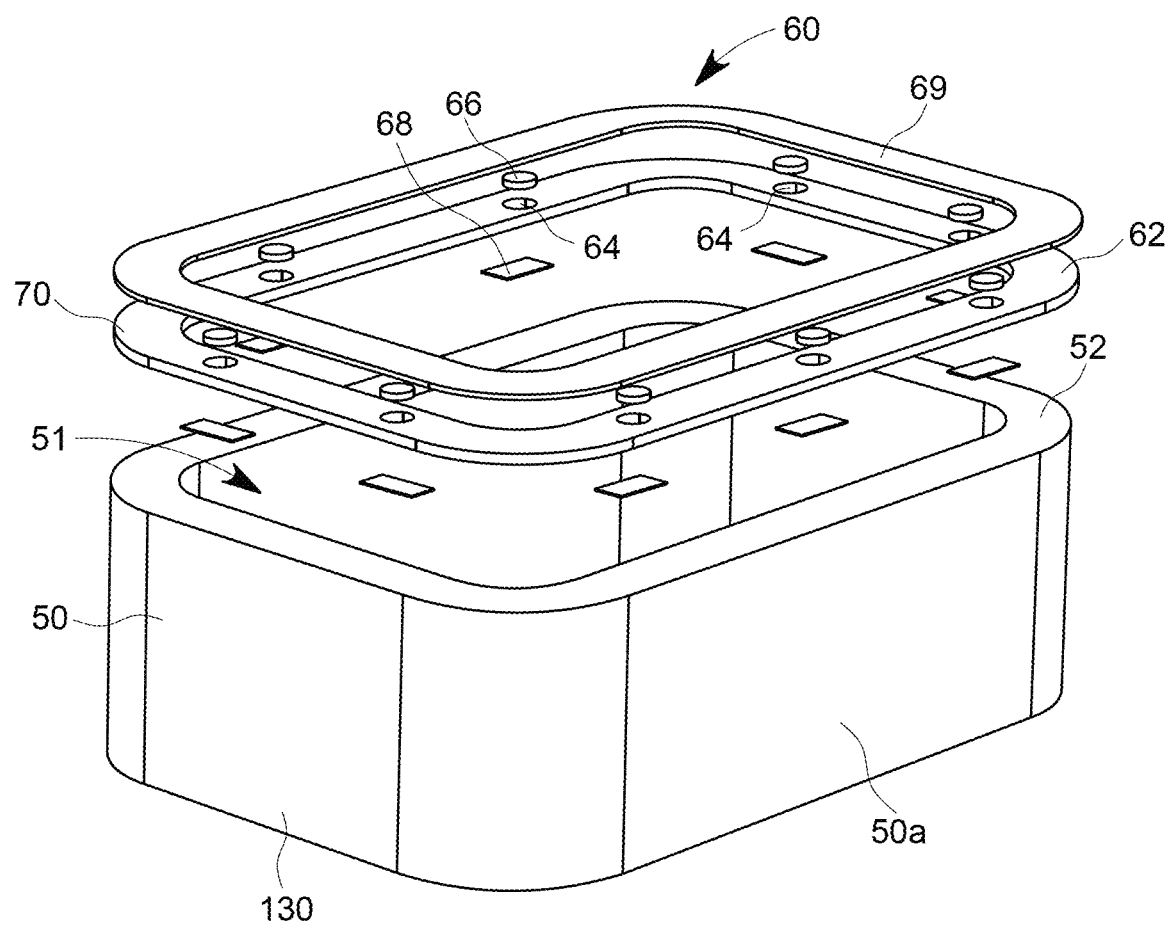
FIG. 12 is an exploded view of a body insulation member and body closure member of the present invention.
Figure 15:
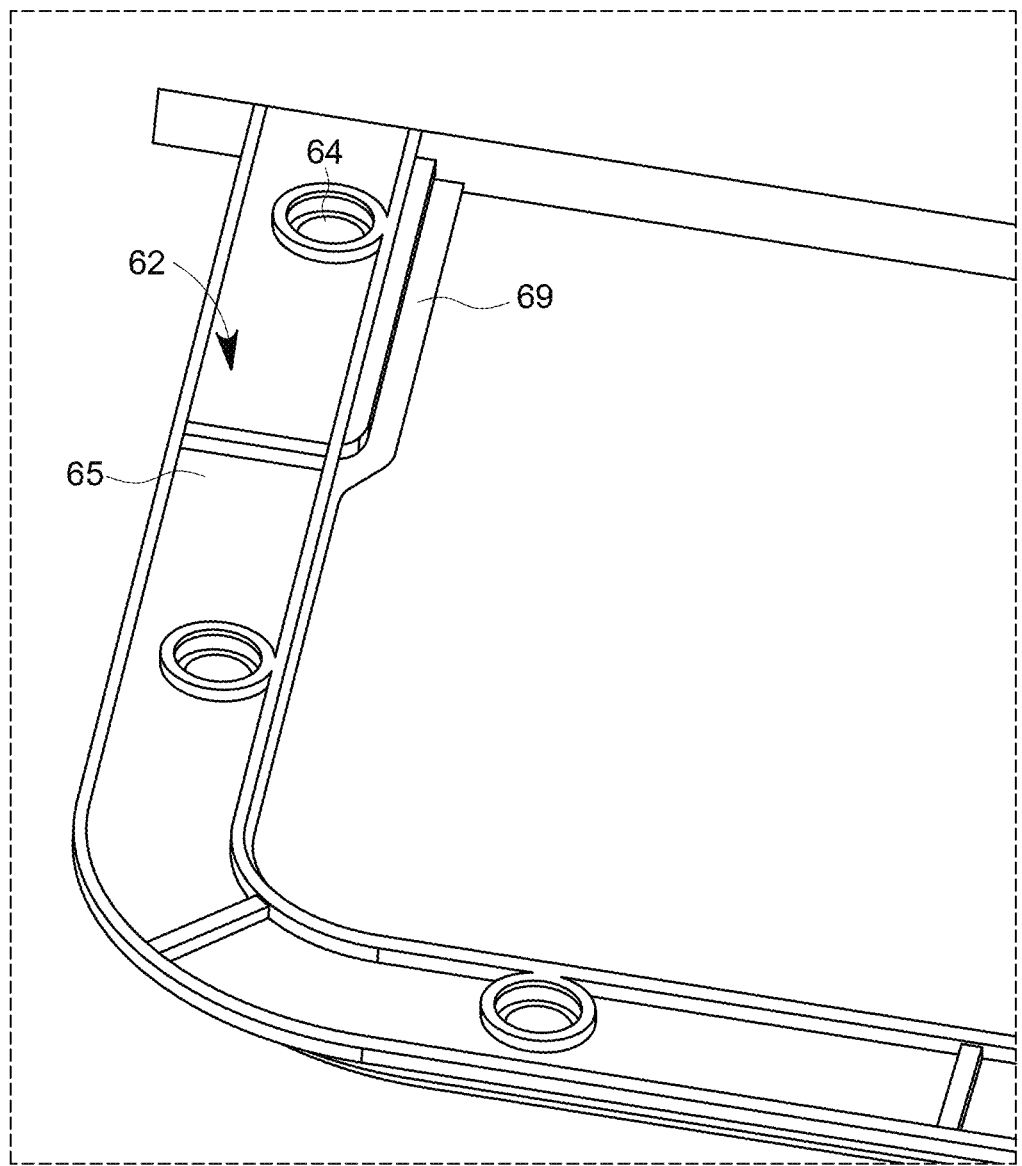
FIG. 15 is a partial bottom perspective view of the body closure member of FIG. 12.
Figure 16:
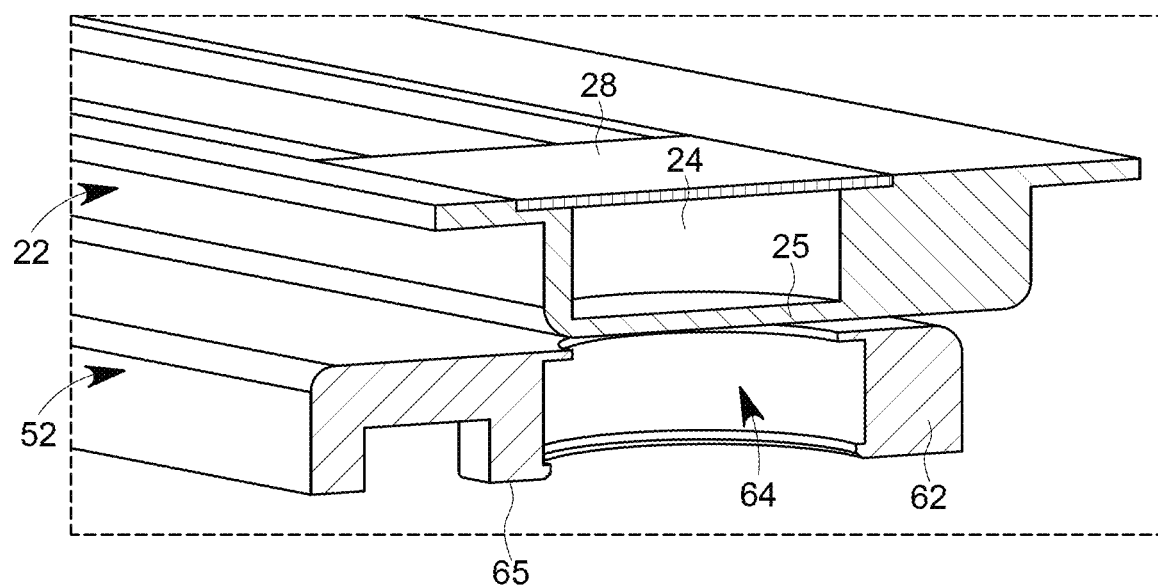
FIG. 16 is a sectional view of respective lid and body closure members of FIGS. 11 and 12, respectively, in an engaged state, shown without magnetic members and liners.

Referring to FIGS. 12 and 15, the base assembly 50 includes a space 51 therein for storing items such as food and beverages in the cooler 1. A top portion of the base assembly 50 also includes a lower body closure member or magnetic assembly 60 having a housing member, in this embodiment, a lower tray, holding assembly or ring 62 constructed of plastic. The lower tray 62 is sized and shaped to attach to a top surface 52 of the base assembly 50 or a top surface of the body insulation member 130. In this embodiment, the top surface 52 of the base assembly 50 is rectangular so the lower tray 62 is rectangular as well, and the lower tray 62 is shaped and sized substantially similar to the upper tray 22. In other embodiments where the base assembly 50 is of another shape, such as square, the lower tray 62 is shaped as a square. The lower tray 62 includes a plurality of spaced apart apertures 64 for receiving and housing a plurality of magnetic members 66. In this embodiment, the apertures 64 and magnetic members 66 are cylindrical in shape but other cross-sectional shapes, such as oval, square or rectangular, could be used as well. The apertures 64 are shaped and sized substantially similar to the magnetic members 66 such that the magnetic members 66 are housed therein by friction fit or form fit. Moreover, the positioning of the magnetic members 66 correspond to the positioning of the magnetic members 26 of the upper magnetic assembly or lid closure member 20 such that when the cooler 1 is in a closed state, as shown in FIG. 16, corresponding magnetic members 26, 66 are aligned and engaged. One of the magnetic members 26, 66 could be replaced with ferromagnetic material so save on cost while still retaining sufficient magnetic attraction to keep the cooler 1 in a closed state when engaged.

Referring to FIG. 12, the magnetic members 66 are further secured to the apertures 64 with adhesive tape 68 constructed of TPU material by applying the tape 68 on a bottom surface 65 of the lower tray or holding assembly 62 below each aperture 64 with the magnetic member 66 housed therein. Alternatively, no tape could be used or an extended tape could be applied continuously on the bottom surface 65 of the lower tray 62 to cover more than one magnetic member 66 with the extended tape. In this embodiment, each magnetic member 26, 66 is an N54 magnet having a diameter of 12 mm. However, other types of magnets with other shapes and sizes could be used. A further thin inner liner fabric 69 shaped and sized substantially similar to the lower tray 62 is positioned on a top surface 70 of the lower tray 62, thereby securing the magnetic members 66 within the apertures 64. In this embodiment, the inner liner fabric 69 is a TPU material but other materials could be used. Alternatively, the cavities or receptacles 64 could have an adhesive to secure the magnetic members 66 therein. In a further alternative, the magnetic members 66 could be injection molded with the tray or ring 62 thereby embedding the magnetic members 66 within the injection molded plastic. In one embodiment, the inner liner fabric 69 is then attached to the top surface 52 of the base assembly 50 by high frequency welding of opposing TPU material of the inner liner fabric 69 and the top surface 52 of the base assembly 50 having its own liner fabric 36. In another embodiment, the lower tray 62 is positioned on top of the body insulation member 130 and under the liner fabric 36, thereby securing the lower tray 62 to the body assembly 50, as shown in FIGS. 17-19.

The number of magnetic members 26, 66 could vary based on the area covered by the upper and lower magnetic assemblies 20, 60. For larger coolers, more magnetic members 26, 66 are used. The magnetic members 26, 66 are space apart such that when the lid assembly 10 is closed, a secure seal is formed between the lid assembly 10 and the base assembly 50. Alternatively, the tray, holding assembly or ring 22, 62 could be entirely magnetic or ferro-magnetic without having a separate plastic tray, as shown in FIG. 18.

Figure 20:
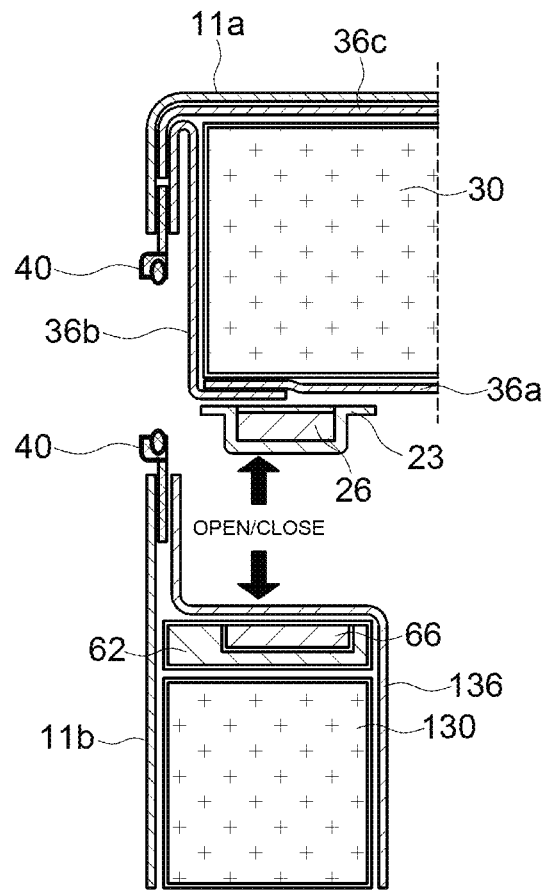
FIG. 20 illustrates the function of the lid and body closure members of FIG. 19.

In operation, when the cooler 1 is in a closed state, as shown in FIGS. 17-20, opposing magnetic or ferro-magnetic members 26, 66 of the lid assembly 10 and the base assembly 50, respectively, align with each other and are attached via magnetic force. Furthermore, areas of the bottom surface of the lid assembly 12 and top surface of the base assembly 52 outside of the areas of the magnetic or ferro-magnetic members 26, 66 are also engaged. In this configuration, the lid assembly 10 is secured to the base assembly 50 and forms an engagement minimizing air and liquid from entering and exiting the cooler 1. In transport, the user further closes the fastener 40 to provide a water-tight seal. To open the cooler 1 to an opened state, as shown in FIG. 20, the user engages the lid assembly 10 and pulls upward to release the magnetic or ferro-magnetic members 26, 66 from each other.

FIGS. 17-20 show the embodiments of the closure assemblies, including those described above, in assembled states.

In FIG. 17, the closure assembly includes upper and lower trays or holding assemblies 22, 62 with magnetic members 26, 66 positioned within the respective receptacles 24, 64 as described above. The upper tray or lid closure member 22 is positioned within a cutout 30a of the lid insulation member 30 and enclosed within the inner lining 36. In this embodiment, the inner lining of the lid assembly 10 includes a lower inner lining 36a, which coincides with an L-shaped intermediate inner lining 36b. The lower and intermediate inner linings 36a, 36b are welded together at least at a lower distal end of the intermediate lining 36b. An upper distal end of the intermediate inner lining 36b includes a loop which coincides with a distal end of an upper inner lining 36c. The zipper 40 includes an upper zipper tape which extends to the distal end of the upper inner lining 36c and coincides with the loop of the intermediate inner lining 36b. The lid exterior fabric 11a includes a distal end extending to the upper zipper tape and coincides with the loop of the intermediate inner lining 36b. The lid exterior fabric 11a is sewn to the distal end of the upper inner lining 36c and the loop of the intermediate lining 36b. The lid exterior fabric 11a is also sewn to the upper tape of the zipper 40 and the loop of the intermediate lining 36b. As such, the lid insulation member 30 and lid closure member 22 are completely enclosed.

Still referring to FIG. 17, the lower tray or body enclosure member 62 is positioned on top of the body insulation member 130 and enclosed within the body inner lining 136. In this embodiment, the inner lining of the body assembly 50 extends only on the inner and upper portions of the body assembly 50, but in other embodiments, could extend on the outer portion of the body assembly 50 as described above. The body inner lining 136 extends above the lower tray 62 and then upwardly to a distal end. The zipper 40 includes a lower zipper tape which extends downwardly to coincide with the distal end of the body inner lining 136. The body exterior fabric 11b includes a distal end extending to the lower zipper tape and coincides the distal end of the body inner lining 136. The body exterior fabric 11b is sewn to the lower zipper tape of the zipper 40 and the distal end of the lower inner lining 136. As such, the body insulation member 130 and body closure member 62 are completely enclosed.

Alternatively, as shown in FIG. 18, while the general structure is substantially similar to FIG. 17 (with like components referenced with like numerals), the magnetic member 66 of the body assembly 50 is a magnetic or ferro-magnetic ring or strip that is positioned on the top surface the body insulation member 130 without the tray or holding assembly 62, as described above. Moreover, the cutout 30a of the lid insulation member 30 extends further upward such that inner side walls 10c, 50c of the lid assembly 10 and the body assembly 50 engage when the cooler 1 is closed, providing further insulation to the cooler 1.

Referring to FIG. 19, again, while the general structure is substantially similar to FIG. 17 (with like components referenced with like numerals), in this embodiment, the upper magnetic members 26 are housed within a strip or strips of TPU fabric 23 and heat welded to the bottom of the lid assembly 10 coinciding with the lower and intermediate inner linings 36a, 36b. In this manner, as shown in FIG. 20, the upper magnetic members 26 stay connected to the lid assembly 10 when the lid assembly 10 and body assembly 50 and engaged and disengaged.

Cooler with Interior Liner Compartments

Figure 24:
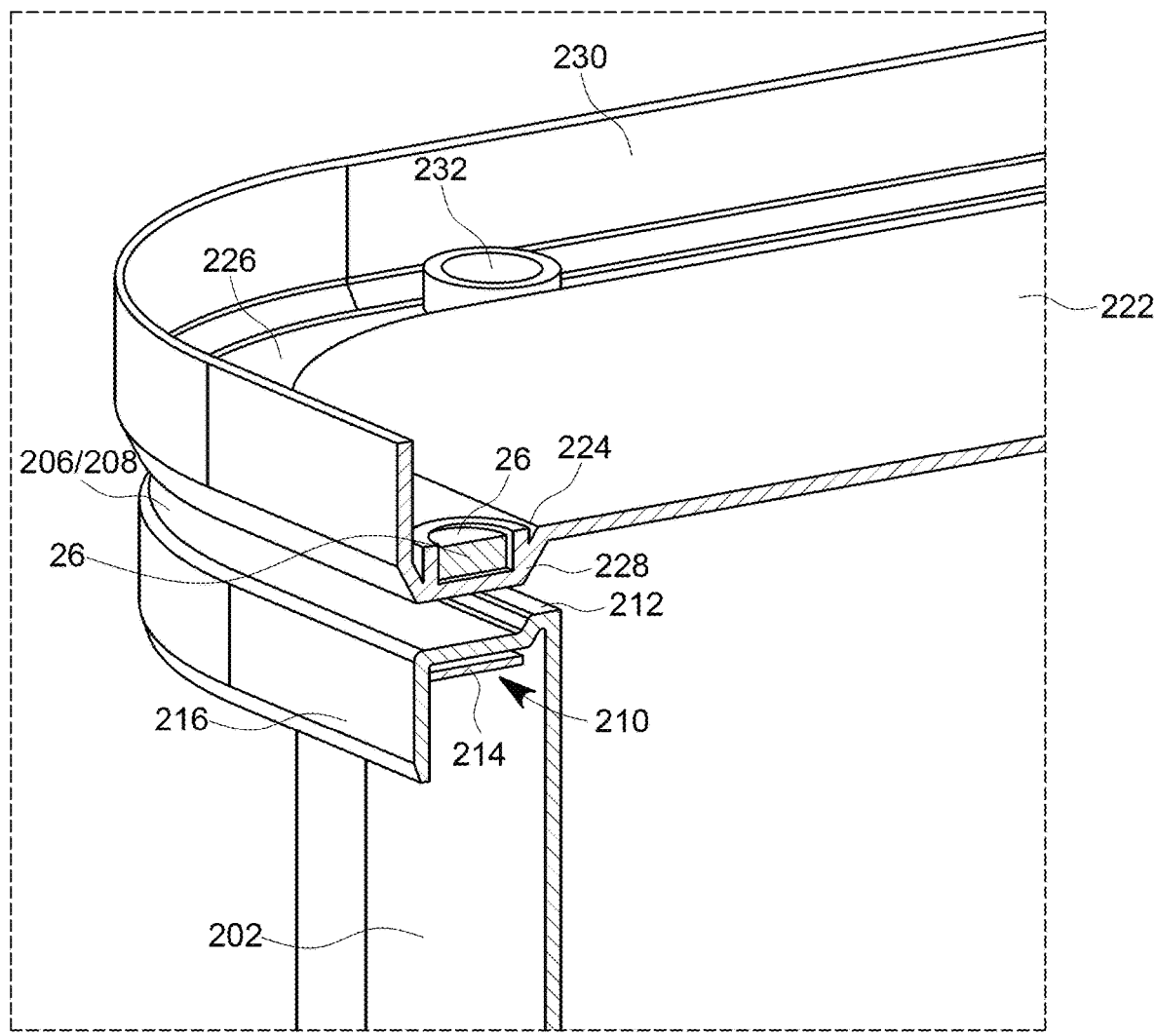
FIG. 24 shows partial perspective and sectional views of the closure assembly of the insulated device of FIG. 21.
Figure 25:
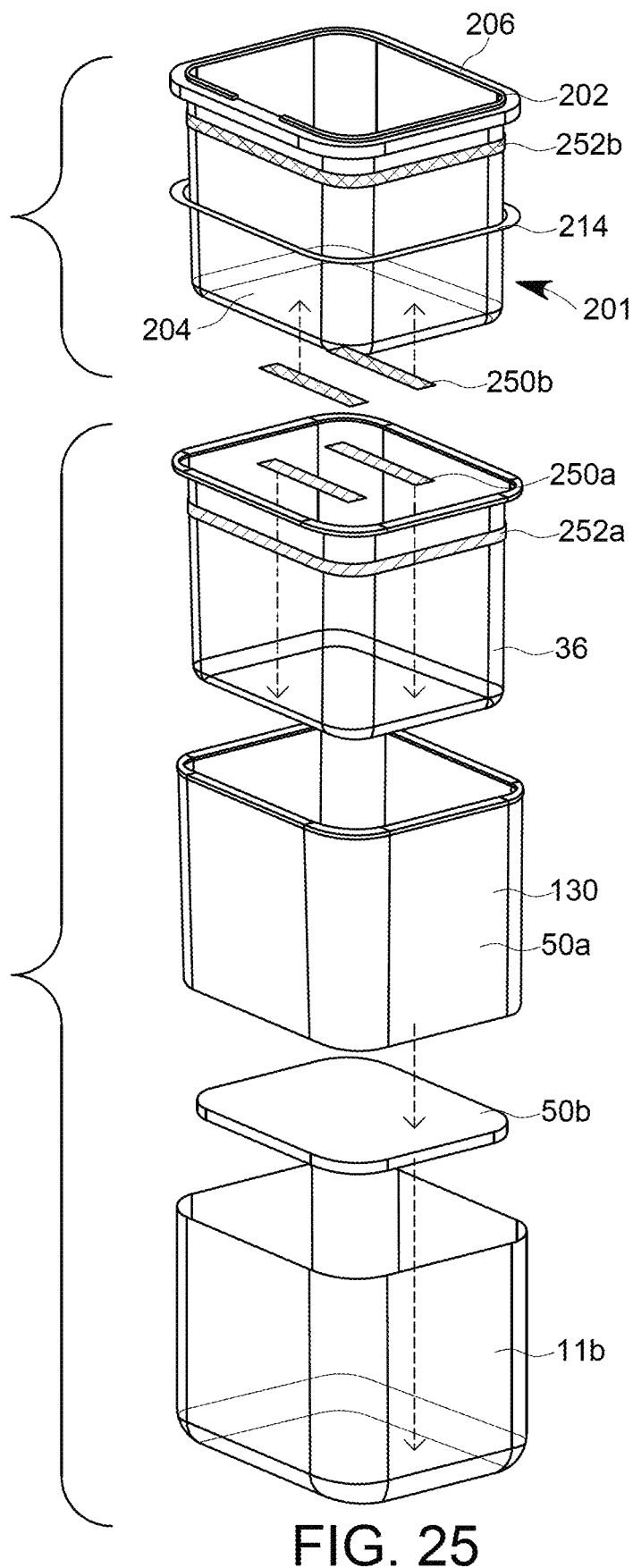
FIG. 25 shows an exploded view of the body assembly of the insulated device of FIG. 21, with some components superimposed.

Referring to FIGS. 21-26, in another embodiment, the cooler 200 of the present invention is shown with a removable rigid interior liner compartment 201 inserted into the space 51 of the insulated compartment described above. The general structure is similar to the embodiments described above and therefore, for the sake of brevity, like components are referenced with like numerals and the descriptions of the same are incorporated by reference. For example, the lid insulation member 30 and the body insulation member 130 are constructed as described above. An inner liner fabric 36, as described above, covers the interior of the body insulation member 130. In this embodiment, the body insulation member 130 includes male portions of a hook and loop fastener 250a adhered to the floor 50b on the surface of the liner fabric 36, as shown in FIG. 25. The body insulation member 130 also includes a continuous strip of a male portion of a hook and loop fastener 252a adhered to an inner surface of the walls 50a on the surface of the liner fabric 36, as shown in FIG. 25 superimposed on the liner fabric 36. The exterior of the body assembly 50 includes an exterior body fabric 11b, as described above.

Figure 26:
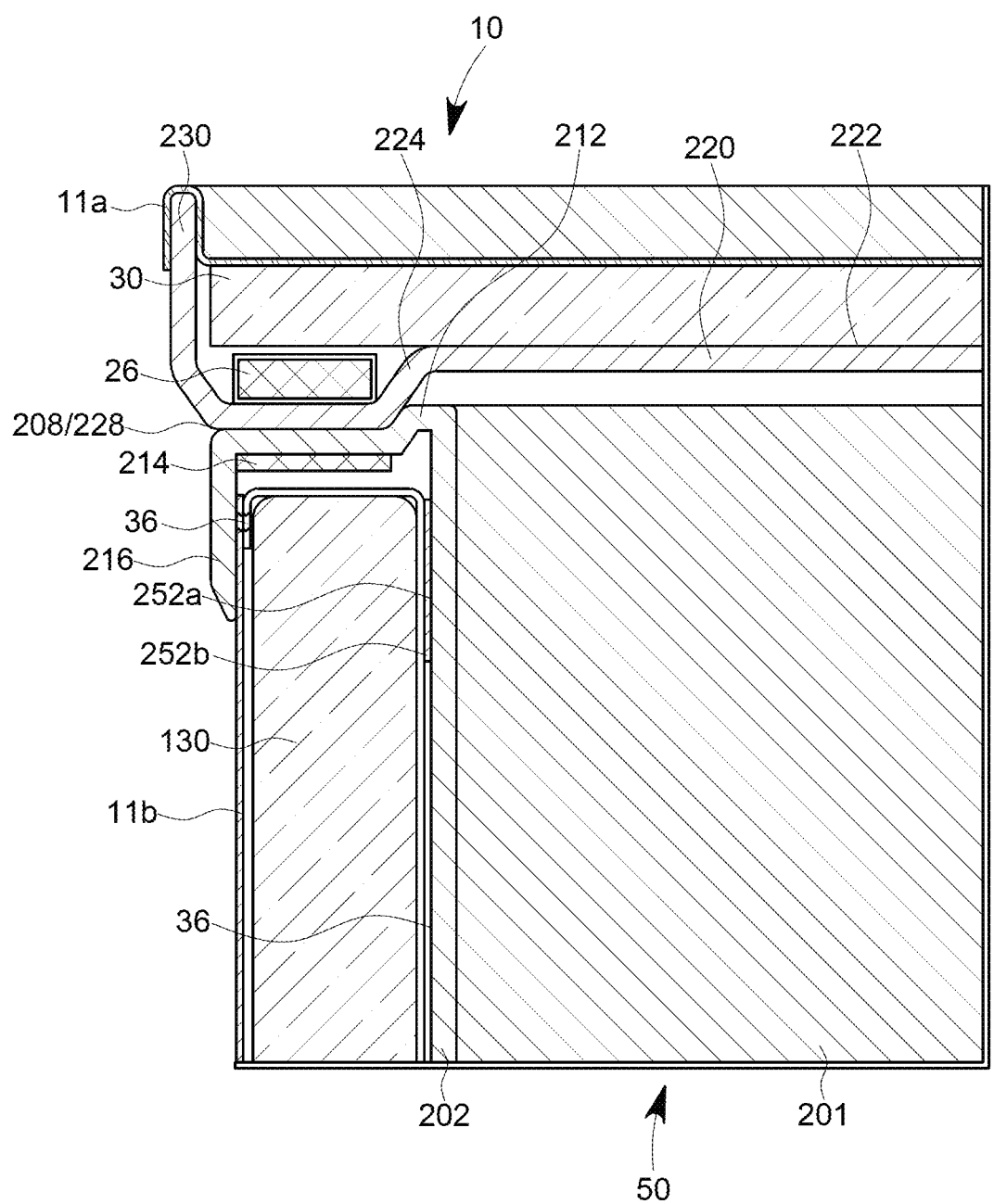
FIG. 26 shows a sectional view of the insulated device of FIG. 21.

Still referring to FIGS. 21-26, in this embodiment, the interior liner compartment 201 includes four walls 202 and a floor 204 to form a storage space or compartment therein. In this embodiment, the liner compartment 201 is constructed of a thin, light-weight injection molded plastic for cost effectiveness and to minimize the loss of magnetic force transmitted therethrough. However, other materials could be used as well, for example, sheet metal. An upper end of the walls 202 include a rim 206 extending therefrom. The rim 206 includes an upper engaging surface 208 and an opposing lower engaging surface 210, with a side wall 216 extending downwardly therefrom. A lower rib member 212 protrudes upwardly from the rim 206 from an inner end of the rim 206, as shown for example in FIGS. 24 and 26. A stamped metal sheet 214, in the form of a flat ring, circumscribes the walls 202 and is fixed by adhesive on the lower engaging surface 210, as shown in FIGS. 24-26. In this embodiment, the metal ring 214 is ferro-magnetic to reduce cost. The interior liner compartment 201 includes female portions of a hook and loop fastener 250*b* adhered to a bottom surface of the floor 204 substantially aligned with the male portions 250*a*, as shown in FIG. 25. The interior liner compartment 201 also includes a continuous strip of a female portion of a hook and loop fastener 252*b* adhered to an outer surface of the walls 202 substantially aligned with the male portion 252*a*, as shown in FIG. 25. As such, when the hook and loop fastener portions 250*a*, 250*b* and the hook and loop fastener portions 252*a*, 252*b* are engaged, the body insulation member 130 and the interior liner compartment 201 are removably coupled together.

Still referring to FIGS. 21-26, in this embodiment, the lid assembly 10 includes a thin injection molded plastic lid member 220 having a raised generally flat surface 222 at a central portion thereof. The flat surface 222 ramps downwardly via an upper rib 224 that is sized and shaped to engage the lower rib 212 in a substantially form fit manner. An upper surface 226 and an opposing lower engaging surface 228 extends outwardly from the upper rib 224, and a side wall 230 extends upwardly from the upper surface 226. The upper surface 226 includes one or more receptacles 232 for receiving one or more magnetic members 26, which are housed within the receptacles 232 as described above. In FIG. 26, the sectional view of the cooler 200 is shown without the receptacle 232 for purposes of clarity. The lower engaging surface 228 is sized and shaped to match the size and shape of the upper engaging surface 208 of the interior liner compartment 201. As shown in FIG. 26, the lid insulation member 30, as described above, is positioned on the flat surface 222 and extends above the receptacles 232 to or near the side wall 230. The exterior fabric 11*a*, described above, is positioned above the lid insulation member 30 and fixed to the side wall 230 by stitching.

Figure 21:
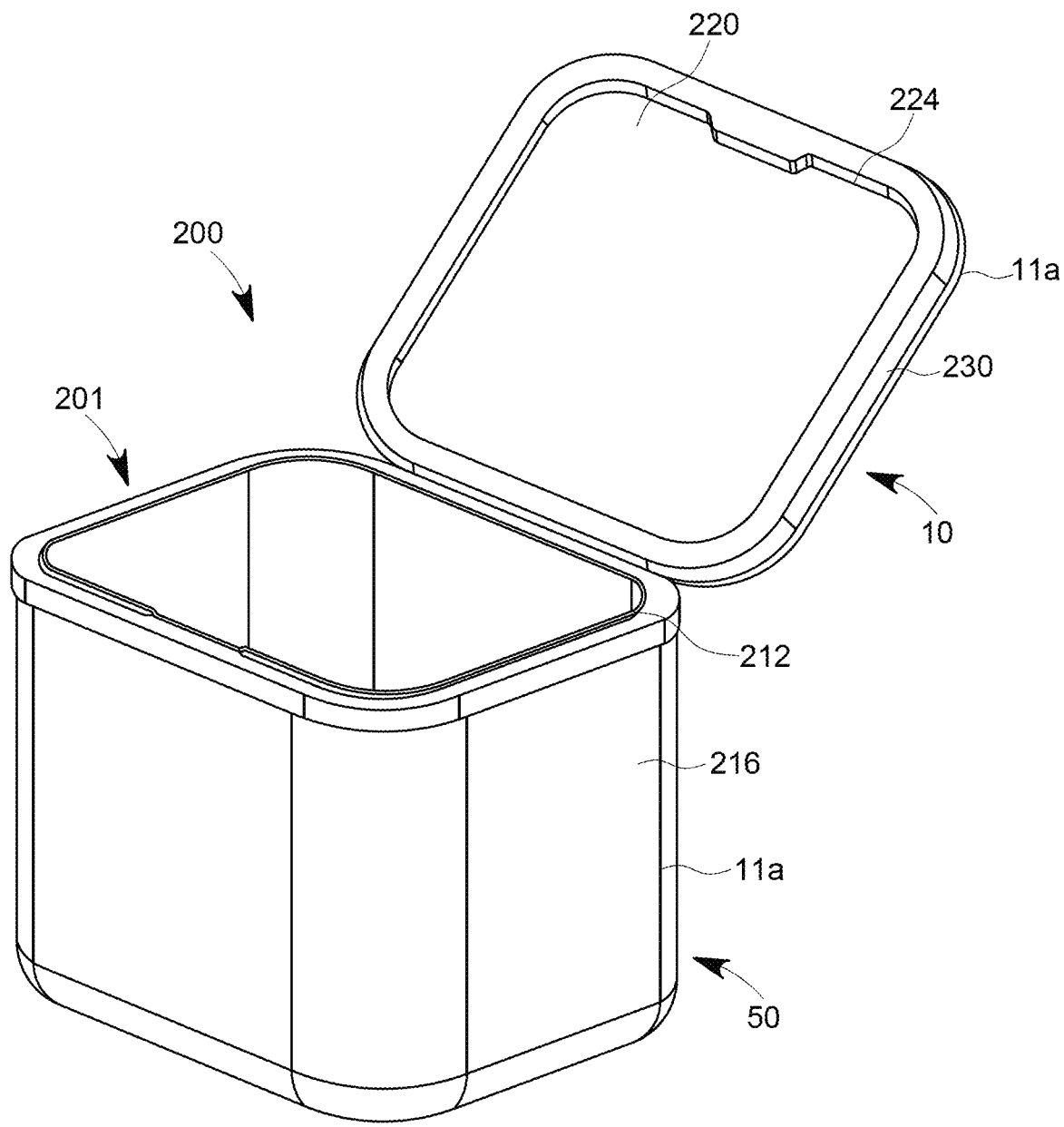
FIG. 21 is a perspective view of another embodiment of an insulated device of the present invention.
Figure 22:
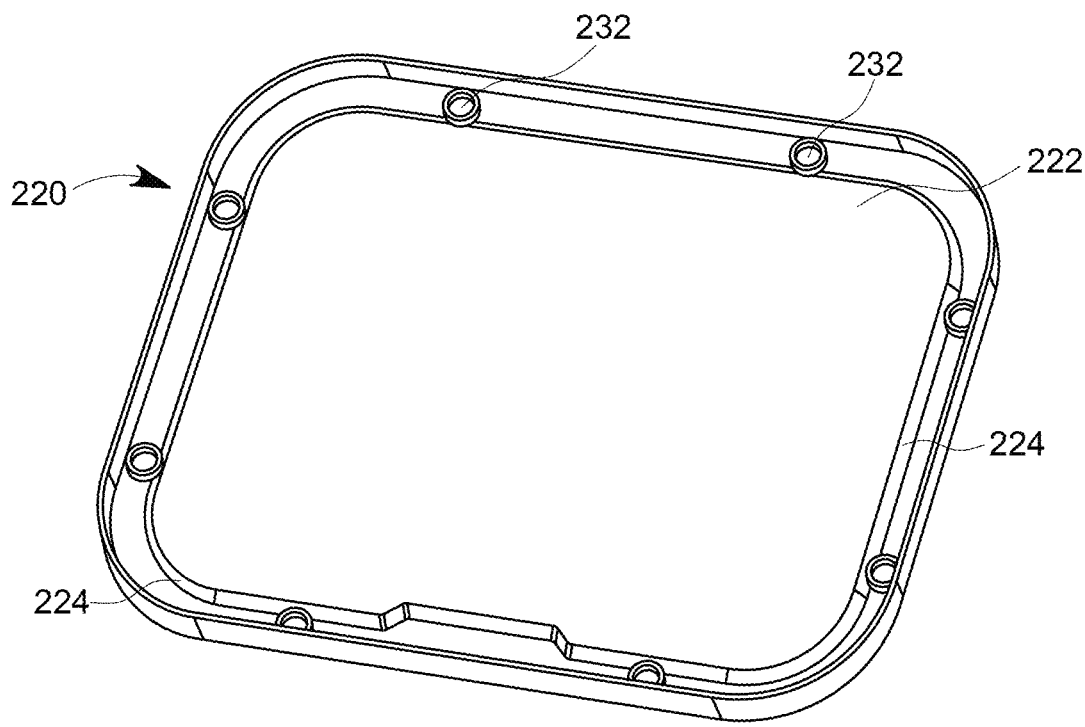
FIG. 22 shows the lid assembly of the insulated device of FIG. 21.
Figure 23:
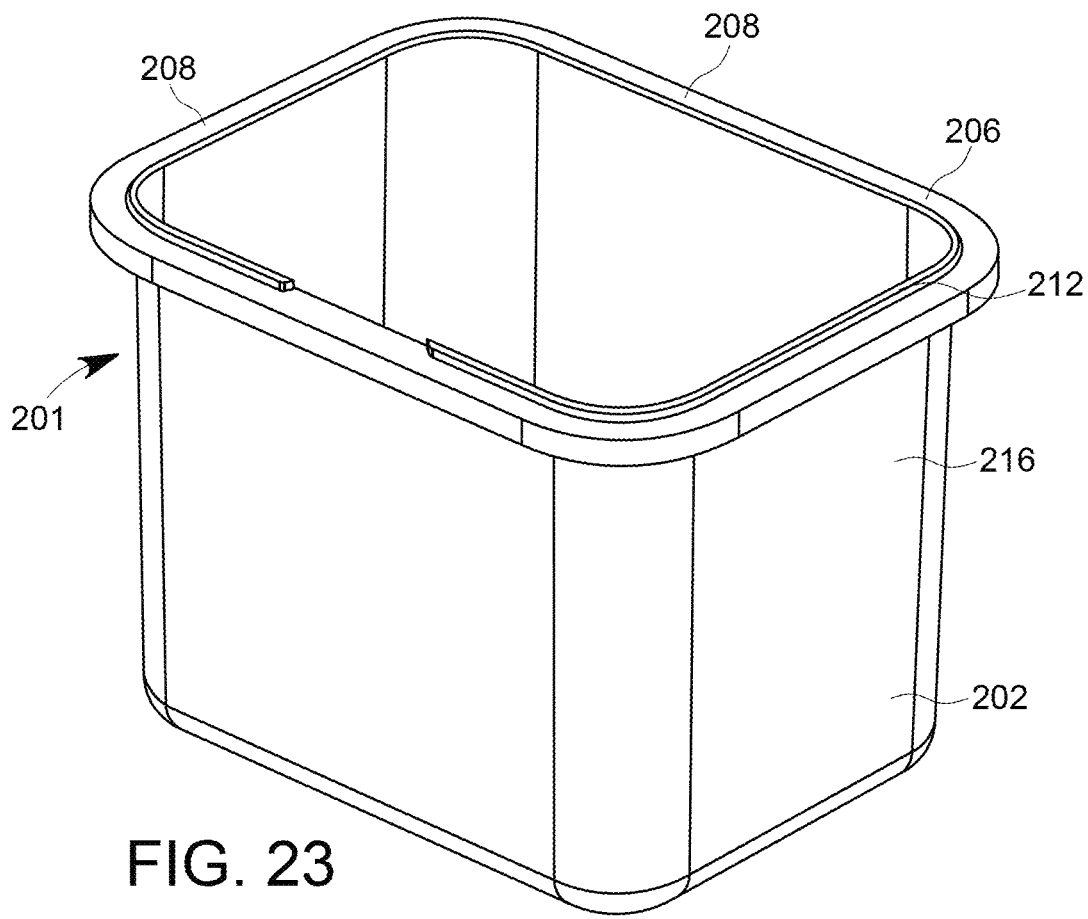
FIG. 23 shows the second compartment of the insulated device of FIG. 21.

Referring to FIG. 26, the liner fabric 36 of the body assembly 50 extends along the inner surface, top surface and outer surface of the body insulation member 130, with a distal end positioned above a distal end of the rim side wall 216. The exterior body fabric 11*b* extends along the outer surface of the body insulation member 130 and overlaps the distal end of the liner fabric 36, where the overlap is sewn together. In a closed state of the cooler 200, engagement of the lower surface 208 of the lid member 200 and the upper surface of the rim 206 is maintained by the magnetic force between the magnet 26 and the stamped metal 214. This magnetic engagement is sufficient such that an additional locking mechanism is not necessary. However, optionally, the cooler could be equipped with an additional locking mechanism, such as those described herein, e.g. zipper, latch, etc., if desired. The lid assembly 10 is attached to the interior liner compartment 201 via respective exterior fabric covers 11*a*, 11*b* to form a hinged coupling, as shown in FIG. 21.

Figure 27:
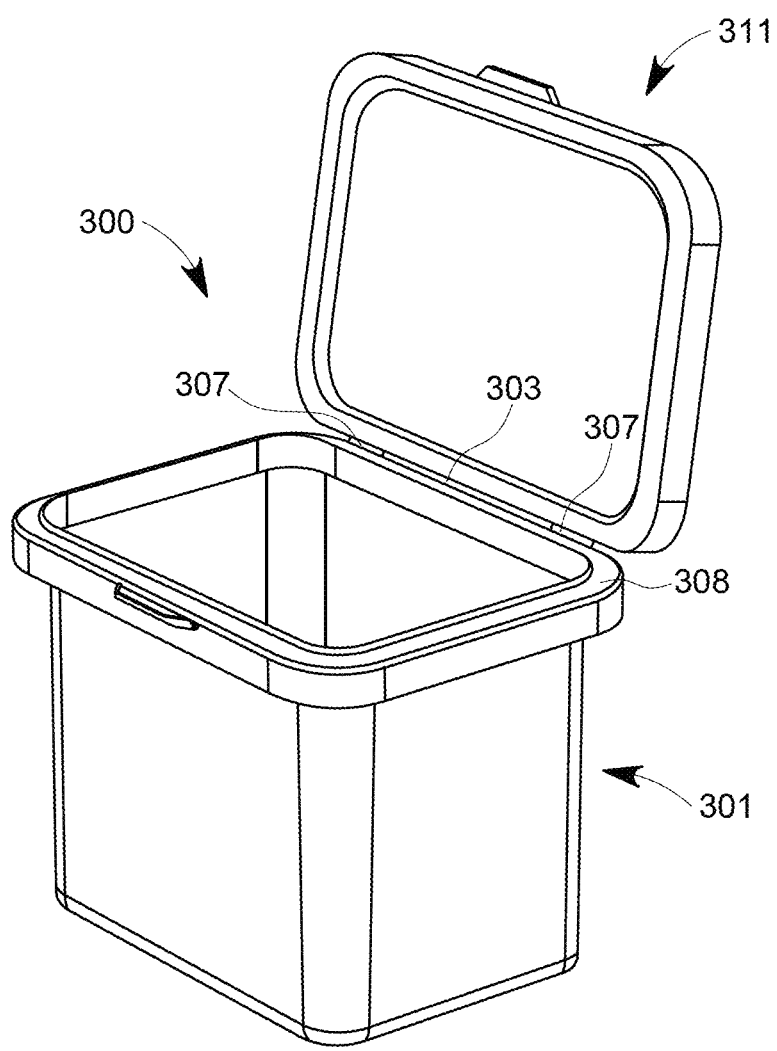
FIG. 27 is a perspective view of an alternative embodiment of a lid assembly and second storage compartment of the insulated device of FIG. 21, shown without body and lid insulation members.

Referring to FIGS. 27-33, in another embodiment of a cooler 300 of the present invention, a rigid interior liner compartment 301 is inserted into the space 51 of the insulated body assembly compartment 130 described above and fixed thereto. In FIG. 27, the interior liner compartment 301 is shown without the body insulation member 130 for purposes of clarity. Again, the general structure of the outer portion of the cooler 300 could be similar to or the same as the embodiments described above. For example, the lid insulation member 30 and the body insulation member 130 are constructed as described above. Moreover, the liner compartment 301 in this embodiment includes the same or similar structural features as the liner compartment 201 described above. For the sake of brevity, like components are referenced with like numerals and the descriptions of the same are incorporated by reference.

Figure 28:
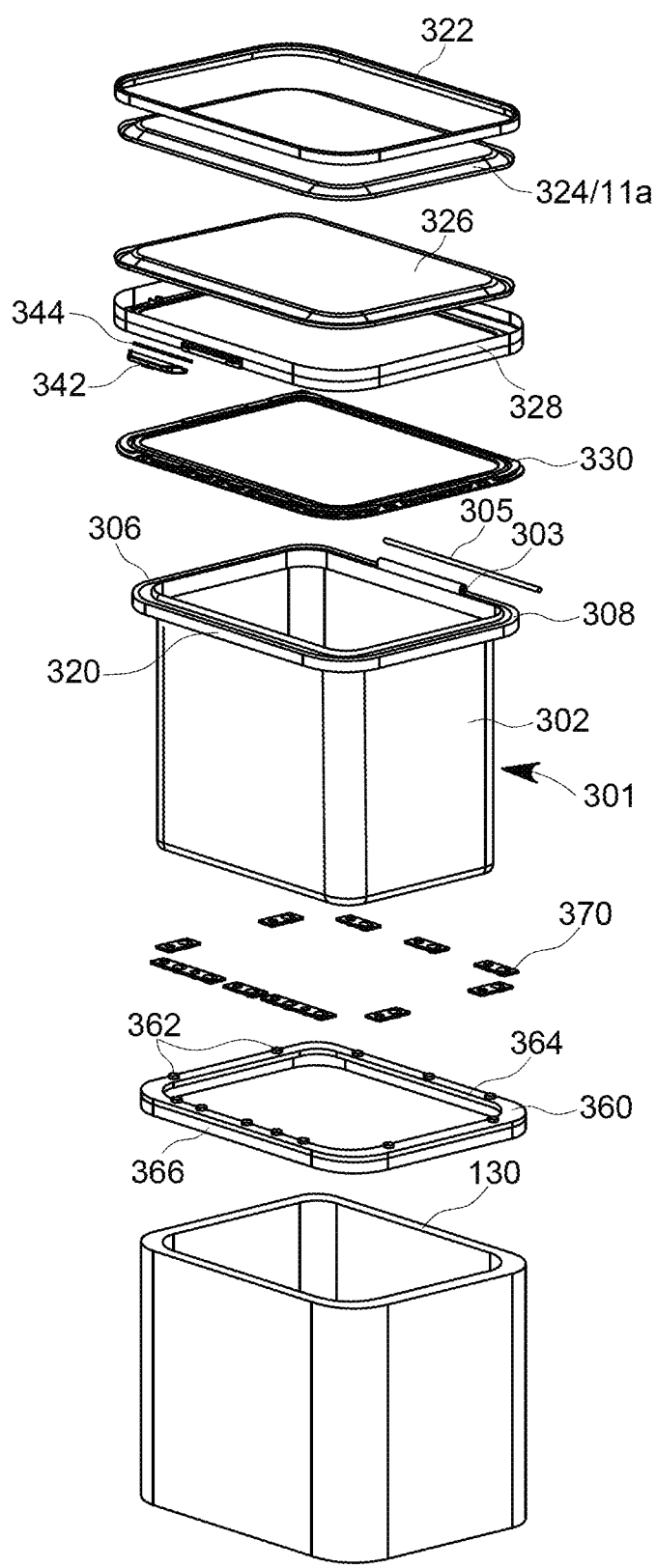
FIG. 28 is an exploded view of the insulated device of FIG. 27.
Figure 32:
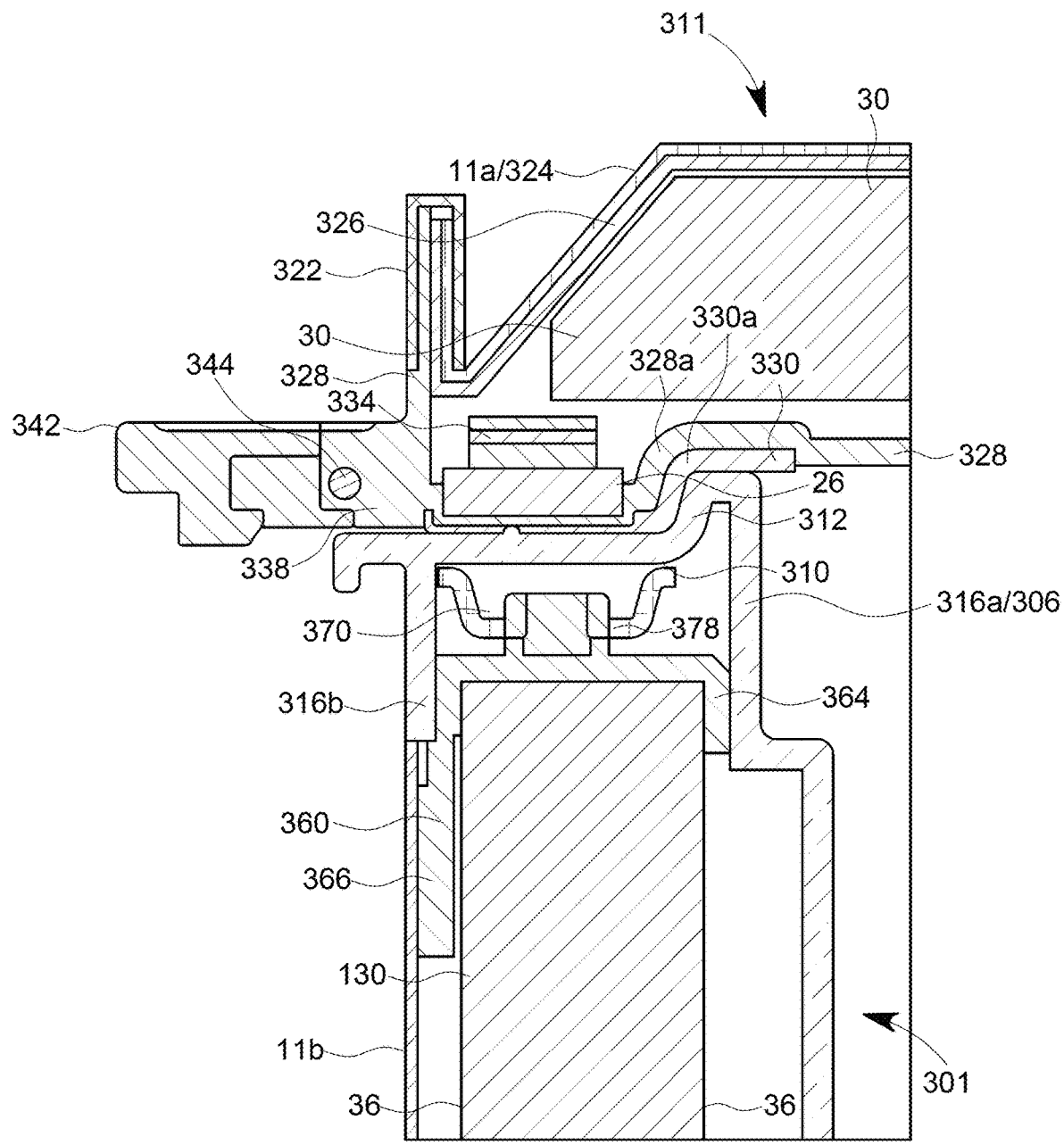
FIG. 32 is a sectional view of the insulated device of FIG. 27.

Referring to FIGS. 28 and 32, in this embodiment, the body closure member is a snap ring 360 shaped and sized to fit over the top surface of the body insulation member 130, more specifically, over the inner liner 36 of the body insulation member 130. In this embodiment, the snap ring 360 is constructed of injection-molded plastic, but the materials used are not limiting. The snap ring 360 includes a top portion having a plurality of protrusions 362, which are, in this embodiment, substantially circular in shape. An inner wall 364 extends downwardly from the top portion on one side and an outer wall 366 extends downwardly from an opposing side. A space is formed between the inner and outer walls 364, 366 below the protrusions 362 for engaging the top surface of the body insulation member 130. The exterior fabric 11*b* is positioned on the outer wall of the body insulation member 130 and overlaps the snap ring outer wall 366. On the outside, the snap ring 360 is fixed to the body insulation member 130 by sewing the exterior fabric 11*b*, the snap ring inner wall 364, and the inner liner 36 of outer wall of the body insulation member 130. On the inside, the snap ring 360 is fixed to the body insulation member 130 by sewing the snap ring inner wall 364 to the inner liner 36 of the inner wall of the body insulation member 130. Alternatively, insulation member 130 could be provided without the inner liner 36, and the snap ring inner and outer walls 364, 366 could be attached directly to the insulation member 130 by methods such as heat welding or adhesive. In this embodiment, the outer wall 366 extends further downwardly than the inner wall 364, as shown in FIG. 32, but the lengths could vary without departing from the spirit and scope of the present invention.

Figure 33:
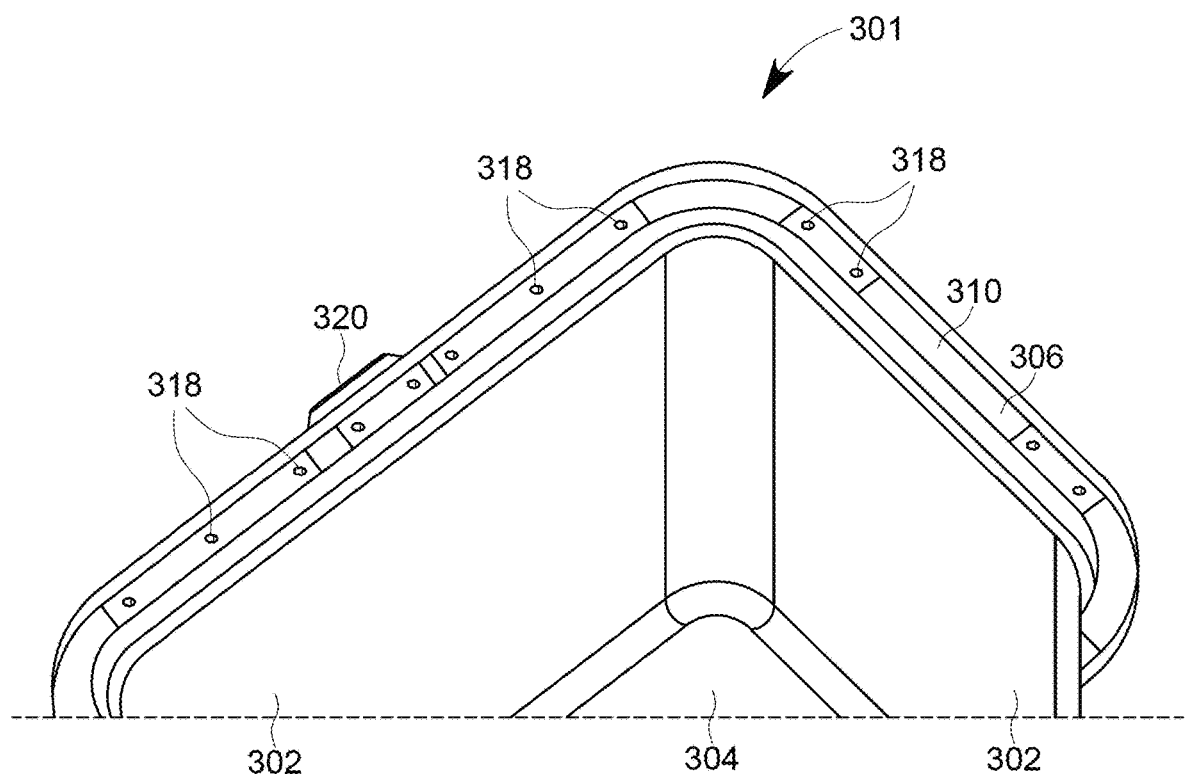
FIG. 33 shows a bottom perspective view of the second storage compartment of FIG. 27.

Referring to FIGS. 28, 32 and 33, the liner compartment 301 includes four walls 302 and a floor 304 to form a storage space or compartment therein. The liner compartment 301 also includes a hinge 303 integrally formed therewith. In this embodiment, the liner compartment 301 is constructed of a thin injection molded plastic for cost effectiveness and to minimize interference of magnetic forces transmitted therethrough. However, other materials could be used as well, for example, sheet metal. An upper end of the walls 302 includes a rim 306 extending therefrom. The rim 306 includes an upper engaging surface 308 and an opposing lower engaging surface 310, with opposing inner and outer side walls 316*a*, 316*b* extending downwardly therefrom. A lower rib member 312 extends upwardly from an inner end of the rim 306, as shown for example in FIG. 32. Also, a lower latch 320 extends outwardly from the upper engagement surface 308. The lower surface 310 is provided with a plurality of spaced apart threaded screw bosses 318, as shown in FIG. 33, for receiving a fastener such as a threaded screw.

Figure 30:
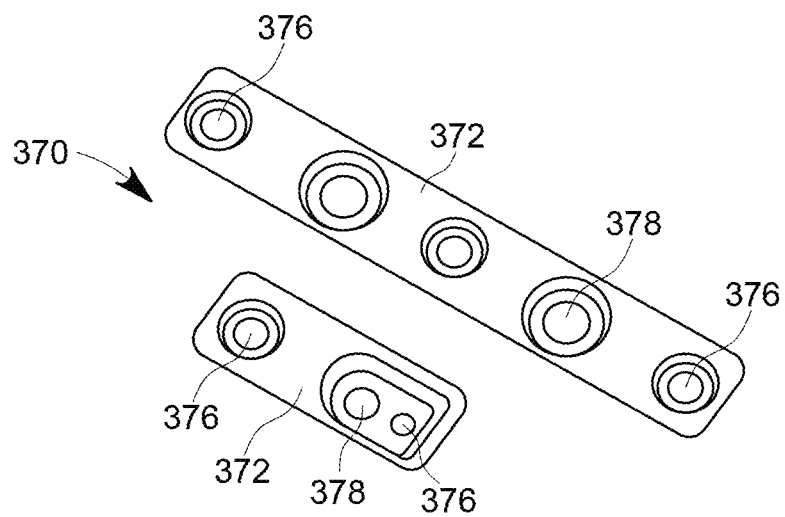
FIGS. 30 and 31 show top and bottom views, respectively, of brackets of the insulated device of FIG. 27.
Figure 31:
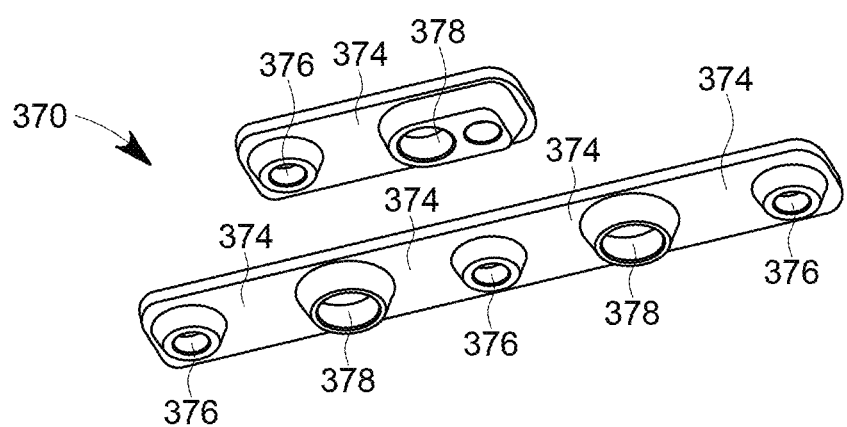

Referring to FIGS. 30 and 31, top and bottom views, respectively, of brackets 370 are shown. As shown in the figures, the brackets 370 could vary in size. Each bracket 370 includes a flat top side 372 and a bottom side 374. Each bracket 370 also includes at least one screw boss cavity 376 and at least one snap boss cavity 378. The brackets 370 are installed on the interior liner compartment 301 by engaging the top side 372 to the rim lower engaging surface 310, and aligning the screw boss cavities 376 with the rim screw bosses 318. A fastener is then extended through each aligned cavity 376 and screw boss 318, and fixed to the rim 306. Each snap boss cavity 378 is positioned to align with a matching protrusion 378 of the snap ring 360. Each snap boss cavity 378 extends downwardly from the bracket 370 and the cavity 378 is shaped and sized to receive a protrusion 362 of the snap ring in a snug or friction fit manner. The bracket 370 is constructed in whole or in part of magnetic or ferro-magnetic materials such as iron, cobalt, nickel or alloys or compounds containing one or more of the same.

Figure 29:
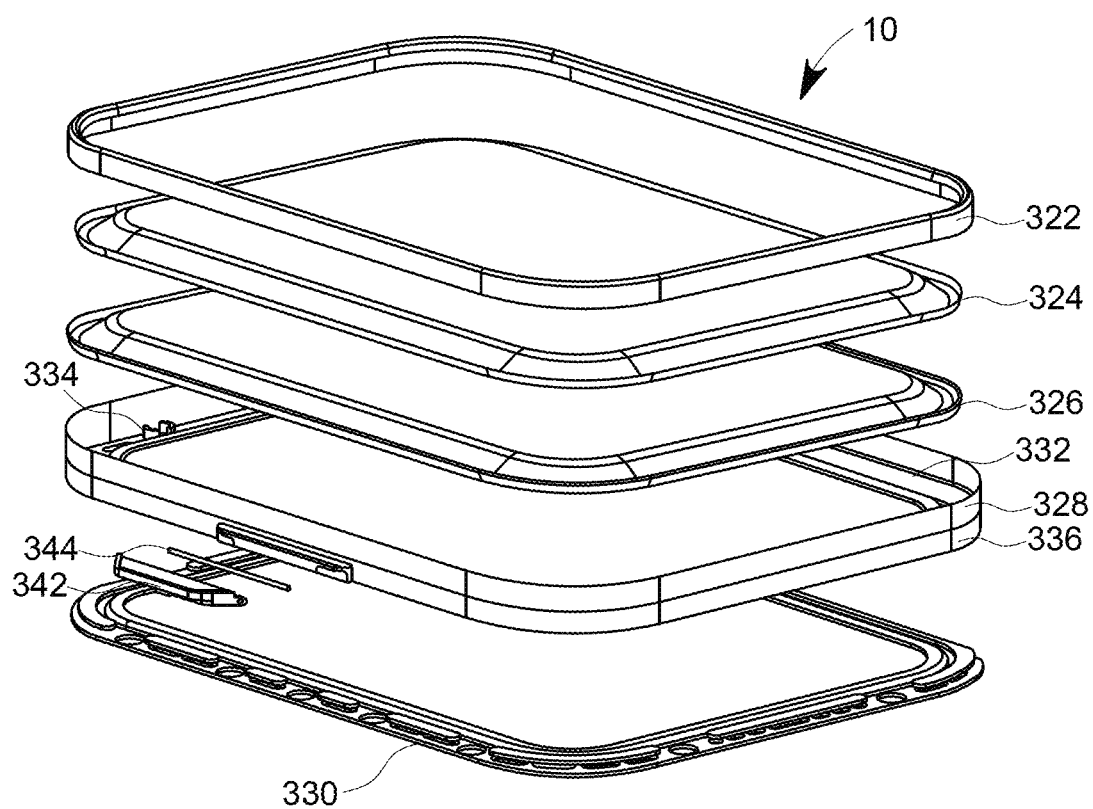
FIG. 29 is an exploded view of the lid assembly of FIG. 27.

Referring now to FIGS. 28, 29 and 32, the lid assembly 311 of the interior liner compartment 301 includes a lid fabric trim 322, a lid fabric 11a/324, an EVA molded lid 326, a hard lid 328 and a plastic overmold 330. The lid insulation member 30 is positioned between the EVA molded lid 326 and the hard lid 328, as shown in FIG. 32. The lid insulation member 30 is not shown in FIGS. 28 and 29 for purposes of clarity. The hard lid 328 is a ring with an empty central portion and includes a peripheral base 332 having a plurality of receptacles 334 for receiving and retaining magnets 26 in the same manner described above with respect to the trays or holding assemblies 22, 62. As shown in FIG. 32, each receptacle 334 includes a lower area where the magnet 26 is snugly positioned therein. The receptacle 334 includes a flexible cylindrical wall extending upwardly above the magnet 26, which is smaller in diameter than the lower area and the magnet 26. As a result, the magnet 26 is further secured within the receptacle 334. The receptacles 334 and magnets 26 are positioned on the hard lid 328 such that they align with open surfaces of the bracket top side 372 when the lid assembly 311 and the interior liner compartment 301 are engaged, as shown in FIG. 32. The hard lid 328 also includes a wall 336 extending from the base 332 vertically. The hard lid 328 also includes a pair of spaced apart and aligned hinges 307 (FIG. 27) configured to be positioned on opposing sides of the interior compartment hinge 303 (FIG. 28) and align therewith so that a hinge pin 305 (FIG. 28) could extend therethrough and fix the respective hinges 303, 307 together for a rotatable engagement between the lid assembly 311 and the interior compartment 301. The hard lid 328 further includes a latch attachment 338 having an aperture 340 extending from the wall 336. An upper latch 342 is rotatably coupled to the latch attachment 338 via a latch pin 344, as shown in FIG. 32. The hard lid 328 includes holes on the bottom surface of the base 332. The overmold 330 is attached to the bottom surface of the hard lid 328 by injection molding. That is, during manufacture, a mold of the overmold 330 is positioned on the bottom surface of the base 332 and the plastic injected into the mold fills the holes of the bottom surface of the base 332, thereby securing the overmold 330 to the hard lid 328.

Referring to same figures, the hard lid 328 as well as the overmold 330 includes a rib member 328a, 330a, sized and shaped substantially the same as the interior liner compartment rib member 312 such that the three rib members 312, 328a, 330a overlap and engage each other to form an airtight engagement within the lid assembly 311, as shown in FIG. 32. As such, the overmold 330 acts as a gasket.

Referring to FIG. 32, the lid fabric trim 322 includes free ends such that a space if formed therebetween. Distal ends of the hard plastic lid wall 336, EVA molded lid wall 326 and exterior fabric 11a/324 are overlapped and surrounded with the lid fabric trim 322 and sewn together to enclose a top portion of the lid assembly 311.

In operation, the interior liner compartment 301 is secured to the body insulation member 130 by aligning and attaching opposing brackets 370 and protrusions 362. The lid assembly 311 is rotated and engaged with the interior liner compartment 301, where the bottom surface of the overmold 330 and rim upper engagement surface 308 engage via magnetic attraction between the magnets 26 and the magnetic or ferro-magnetic bracket top side 372. The upper and lower latches 320, 342 are engaged via friction fit and the lid assembly 311 and interior liner compartment 301 are further locked and secured to each other. Optionally, the interior liner compartment 301 can be removed and used without the body insulation member 130 by disengaging the upper and lower latches 320, 342, and the opposing brackets 370 and protrusions 362, and removing the interior liner compartment 301 from the body insulation member 130.

Other Alternatives

The insulated device or cooler of the present invention could take on various shapes and sizes, depending on the construction of the inner panels of the lid assembly and the body assembly. For example, the cooler could be a cube or cylindrical in shape. Moreover, any one of the inner panels of the lid assembly and the body assembly, alone or in combination, could be molded instead of being attached by adhesives or heat welding.

In the embodiments shown in the figures, the cooler is a soft cooler constructed generally of a light-weight materials, but the various features of the present invention could also be incorporated into a hard cooler as well. Moreover, the interior storage compartments 201, 301 could include additional insulating materials.

In an alternative embodiment, the interior storage compartments 201, 301 described above could also be smaller in volume than the outer storage compartment 51 and occupy only an upper volume of the outer storage compartment 50. As such, the smaller interior storage compartment could be used as, for example, a removable tray. In a further alternative, the interior storage compartments 201, 301 could occupy the entire outer storage internal volume 51 and further include the smaller interior storage compartment as a third compartment.

The present invention may be embodied in other specific forms without departing from its spirit or essential characteristics. The described embodiments are to be considered in all respects only as illustrative and not restrictive. The scope of the invention, therefore, will be indicated by claims rather than by the foregoing description. All changes, which come within the meaning and range of equivalency of the claims, are to be embraced within their scope.

The invention claimed is:

1. An insulated device comprising:
   a body assembly comprising: a plurality of walls each comprising a wall top end having a top surface and a wall bottom portion; a first insulation member having a top end, the first insulation member positioned between the wall top surface and the wall bottom portion; and a floor operatively coupled with the plurality of walls proximate the bottom portions of the plurality of walls to form a first storage compartment;
   a lid assembly having a lid top surface and a lid bottom surface, the lid assembly comprising a second insulation member having a top end, the second insulation member positioned between the lid top surface and the lid bottom surface, wherein the lid assembly is at least partially removably coupled with the body assembly; and
   a closure assembly comprising:
      a body closure member comprising a first magnetic or ferro-magnetic member, wherein the body closure member is positioned proximate the wall top surface of the at least one of the plurality of walls, and between the first insulation member and the top surface of the at least one of the plurality of walls; and a lid closure member comprising a second magnetic or ferro-magnetic member, wherein the lid closure member is positioned proximate the lid bottom surface, wherein the lid closure member is positioned between the second insulation member and the lid bottom surface;

wherein at least one of the body closure member and lid closure member comprises a first housing member, the first housing member being a separate holding assembly comprising a plurality of receptacles for housing the first or second magnetic or ferro-magnetic members; and wherein the first storage compartment is enclosed and substantially sealed when the body closure member and the lid closure member are operatively engaged, and the first storage compartment is accessible when the body closure member and the lid closure member are disengaged.

2. The insulated device of claim 1, wherein the body closure member comprises the first housing member, the first housing member positioned on the first insulation member top end.

3. The insulated device of claim 1, wherein the first magnetic or ferro-magnetic member of the body closure member comprises a magnetic or ferro-magnetic strip.

4. The insulated device of claim 1, wherein the lid closure member comprises the first housing member, the first housing member positioned at or near a periphery of the lid assembly.

5. The insulated device of claim 1, wherein the second magnetic or ferro-magnetic member of the lid closure member comprises a magnetic or ferro-magnetic strip.

6. The insulated device of claim 1, wherein the body assembly further comprises a second storage compartment, the second storage compartment positioned within the first storage compartment and operatively coupled thereto.

7. The insulated device of claim 1, wherein at least one of the first and second insulation members is a vacuum insulated panel.

* * * * *